United States Patent
Yeh et al.

(10) Patent No.: US 10,656,762 B2
(45) Date of Patent: May 19, 2020

(54) TOUCH SENSITIVE KEYBOARD SYSTEM AND PROCESSING APPARATUS AND METHOD THEREOF

(71) Applicant: EGALAX_EMPIA TECHNOLOGY INC., Taipei (TW)

(72) Inventors: Shang-Tai Yeh, Taipei (TW); Chun-I Li, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 16/197,577

(22) Filed: Nov. 21, 2018

(65) Prior Publication Data

US 2019/0155451 A1 May 23, 2019

Related U.S. Application Data

(60) Provisional application No. 62/589,652, filed on Nov. 22, 2017.

(51) Int. Cl.
*G06F 3/023* (2006.01)
*G06F 3/044* (2006.01)
(Continued)

(52) U.S. Cl.
CPC ............ *G06F 3/0418* (2013.01); *G06F 3/023* (2013.01); *G06F 3/038* (2013.01); *G06F 3/03545* (2013.01); *G06F 3/044* (2013.01); *G06F 3/0442* (2019.05); *G06F 3/0443* (2019.05); *G06F 3/0445* (2019.05); *G06F 3/0446* (2019.05); *G06F 3/0447* (2019.05); *G06F 3/04166* (2019.05); *G06F 3/04186* (2019.05); *G06F 3/041661* (2019.05); *G06F 2203/04107* (2013.01); *G06F 2203/04112* (2013.01)

(58) Field of Classification Search
CPC .. G06F 3/0418; G06F 3/04166; G06F 3/0445; G06F 3/0442; G06F 3/0446; G06F 3/041661; G06F 3/0443; G06F 3/0447; G06F 3/04186; G06F 3/023; G06F 3/03545; G06F 3/038; G06F 3/044; G06F 2203/04107; G06F 2203/04112
See application file for complete search history.

(56) References Cited

U.S. PATENT DOCUMENTS 10,115,543 B2 * 10/2018 Katsuhara ................. G06F 3/02
10,282,041 B2 *  5/2019 Shinkai .................... G06F 3/044
(Continued)

*Primary Examiner* — Stephen G Sherman
(74) *Attorney, Agent, or Firm* — WPAT, PC

(57) ABSTRACT

A touch sensitive keyboard system, provided by the present invention, includes a touch sensitive input device and a touch sensitive processing apparatus coupled to the touch sensitive input device. The touch sensitive input device includes parallel first electrodes, parallel second electrodes, parallel third electrodes and an elastic dielectric layer between the second and third electrodes. There is at least one approximation intersection area of one of the first electrodes and one of the second electrodes and at least one pressing intersection area of one of the second electrodes and one of the third electrodes inside each key area. In case the touch sensitive processing apparatus determines there is an external object influencing signals of the approximation and pressing intersection areas of one of the key areas, a key sign is transmitted to a host.

38 Claims, 10 Drawing Sheets

(51) Int. Cl.
  *G06F 3/041*     (2006.01)
  *G06F 3/0354*    (2013.01)
  *G06F 3/038*     (2013.01)

(56) References Cited

U.S. PATENT DOCUMENTS

| | | | | |
|---|---|---|---|---|
| 2015/0280708 | A1* | 10/2015 | Goto | H03K 17/98 341/33 |
| 2015/0346839 | A1* | 12/2015 | Kawaguchi | G06F 3/0202 345/168 |
| 2015/0363023 | A1* | 12/2015 | Kawaguchi | G06F 3/044 345/174 |
| 2015/0370339 | A1* | 12/2015 | Ligtenberg | G06F 1/1662 345/168 |
| 2016/0026297 | A1* | 1/2016 | Shinkai | G06F 3/0416 345/174 |
| 2016/0202800 | A1* | 7/2016 | Itaya | G06F 3/044 345/174 |
| 2018/0364851 | A1* | 12/2018 | Yeh | G06F 3/0414 |

* cited by examiner

TOUCH SENSITIVE KEYBOARD SYSTEM AND PROCESSING APPARATUS AND METHOD THEREOF

CROSS REFERENCE TO RELATED APPLICATIONS

This application claims priority to U.S. patent application, 62/589,652, filed on Nov. 22, 2017, the disclosure of which is incorporated herein by reference.

BACKGROUND OF THE INVENTION

1. Field of the Invention

The present invention relates to the field of touch sensitive technology, and more particularly, to a touch sensitive input device and processing apparatus and method thereof.

2. Description of the Prior Art

The touch panel (its thickness) is quite thin and is often used an input device for controlling the cursor in a notebook computer system. In addition to the touch panel, the notebook computer system usually contains a keyboard as another input device. The keys of a traditional keyboard are mechanics with a compression stroke for pressing, it can let the user feel that the key has been pressed and rebounded. However, for providing the compression stroke, the thickness of the traditional keyboard is relatively thick.

A larger touch panel is also used as a keyboard. However, because the touch panel does not have pressure sensing function, it is prone to receive wrong touches of fingers and let the computer system receive incorrect instruction. Besides, the touch panel has no rebound stroke that the traditional keys have. The user must closely observe whether the response of the computer system is correct after pressing the key, causing the user's extra burden. Consequently, there is a need for a thin touch panel, which can output the key signal(s) after sensing the appropriate pressure(s). It can be avoided that soft touches of fingers cause the computer system to receive wrong instruction.

SUMMARY OF THE INVENTION

According to an embodiment of the present invention, it provides a touch sensitive keyboard system including a touch sensitive input device and a touch sensitive processing apparatus coupled to the touch sensitive input device. The touch sensitive input device includes multiple parallel first electrodes, multiple parallel second electrodes, multiple parallel third electrodes and an elastic dielectric layer between the second and third electrodes. Wherein the touch sensitive input device includes a key zone, the key zone includes multiple key areas, each of the first electrodes and the second electrodes form multiple approximation intersection areas in the key zone, each of the second electrodes and the third electrodes form multiple pressing intersection areas in the key zone, each of the key areas includes at least one of the approximation intersection areas and the pressing intersection areas. The touch sensitive processing apparatus includes an interface device coupled to a host, a driving circuit respectively coupled to the second electrodes, a sensing circuit respectively coupled to the first electrodes and the third electrodes, and a processor coupled to the interface device, the driving circuit, and the sensing circuit, and executing a program module. The program module is used to perform the following steps: having the driving circuit respectively drive the second electrodes in turn; having the sensing circuit respectively sense the first electrodes to produce a one-dimensional first sensing information consisting of multiple first sensing information and respectively sense the third electrodes to produce a one-dimensional third sensing information consisting of multiple third sensing information when each of the second electrodes is driven; piecing each of the one-dimensional first sensing information corresponding to its corresponding second electrode together into a two-dimensional first sensing information and piecing each of the one-dimensional third sensing information together into a two-dimensional third sensing information after all the second electrodes have been driven; calculating an approximating position of an external object according to the two-dimensional first sensing information and calculating a pressing position of the external object according to the two-dimensional third sensing information; calculating a reporting position according to the pressing position or the approximating position when the distance between the pressing position and the approximating position is within a range; determining whether the reporting position is in one of the key areas; and having the interface device send a key symbol corresponding to the key area into the host when the reporting position is in one of the key areas.

In the embodiment, the touch sensitive keyboard system further includes the host.

According to an embodiment of the present invention, it provides a touch sensitive processing apparatus coupled to a touch sensitive input device and a host. Wherein the touch sensitive input device includes multiple parallel first electrodes, multiple parallel second electrodes, multiple parallel third electrodes, and an elastic dielectric layer between the second and third electrodes. Wherein the touch sensitive input device includes a key zone, the key zone includes multiple key areas. Each of the first electrodes and the second electrodes form multiple approximation intersection areas in the key zone, each of the second electrodes and the third electrodes form multiple pressing intersection areas in the key zone. Each of the key areas includes at least one of the approximation intersection areas and the pressing intersection areas. The touch sensitive processing apparatus includes an interface device coupled to the host, a driving circuit respectively coupled to the second electrodes, a sensing circuit respectively coupled to the first electrodes and the third electrodes, and a processor coupled to the interface device, the driving circuit, and the sensing circuit, and executing a program module. The program module is used to perform the following steps: having the driving circuit respectively drive the second electrodes in turn; having the sensing circuit respectively sense the first electrodes to produce a one-dimensional first sensing information consisting of multiple first sensing information and respectively sense the third electrodes to produce a one-dimensional third sensing information consisting of multiple third sensing information when each of the second electrodes is driven; piecing each of the one-dimensional first sensing information corresponding to its corresponding second electrode together into a two-dimensional first sensing information and piecing each of the one-dimensional third sensing information together into a two-dimensional third sensing information after all the second electrodes have been driven; calculating an approximating position of an external object according to the two-dimensional first sensing information and calculating a pressing position of the external object according to the two-dimensional third sensing information; calculating a reporting position according to the pressing position or the approximating position when the distance between the pressing position and the approximating position is within a range; determining whether the reporting position is in one of the key areas; and having the interface device send a key symbol corresponding to the key area into the host when the reporting position is in one of the key areas.

In the embodiment, for the touch sensitive input device to provide touch sensitive functions as well, the touch sensitive input device further includes a touch area. Each of the first electrodes and the second electrodes form multiple approximation intersection areas in the touch area. Wherein the program module further includes the following step: having the interface device send the approximating position to the host when the approximating position is in the touch area.

In the embodiment, for providing selections of touch area on different sizes, the relation between the touch area and the key zone selects from one of the following: the touch area including the key zone; and the touch area and the key zone are not overlapped.

In the embodiment, for providing more accurate key position, the reporting position selects from one of the following: the pressing position; the approximating position; a midpoint position between the pressing position and the approximating position; and a weighted position between the pressing position and the approximating position, wherein the weighted position is determined how far it is to the pressing position according to a pressure value of the external object.

In the embodiment, for avoiding wrong touch(es) causing wrong key reporting event(s), the program module further includes the following step: having the interface device send a key symbol corresponding to a key area into the host when the reporting position is in the key area and a pressure value of the external object is further determined it is bigger than a key pressure threshold.

In the embodiment, for avoiding wrong touch(es) causing wrong key reporting event(s), the pressure value is calculated according to one of the following: a sum of multiple third sensing information near the pressing position those are larger than a third threshold value; one of the third sensing information that is closest to the pressing position; a sum of multiple third sensing information those correspond to multiple first sensing information near the approximating position corresponding to the pressing position those are larger than a first threshold value; and a sum of multiple third sensing information near the approximating position corresponding to the pressing position.

In the embodiment, for providing better service of key symbol output that higher sampling frequency is required, the frequency of calculating the reporting position is higher than that of sending the key symbol to the host.

In the embodiment, for providing thinner touch sensitive input device, the first electrodes and the second electrodes are on the same electrode layer, the third electrodes comparing with the second electrodes are closer to the external object.

In the embodiment, for providing thinner touch sensitive input device, the first electrodes and the third electrodes are respectively above/below the upside and the downside of the second electrodes, the first electrodes comparing with the third electrodes are closer to the external object.

In the embodiment, for shielding off the outside electromagnetic interference (EMI), the program module is further used to perform the following step: having all the first electrodes be grounded or connect to a direct current voltage when the one-dimensional third sensing information is produced.

In the embodiment, for shielding off the outside EMI, the program module is further used to perform the following step: having all the third electrodes be grounded or connect to a direct current voltage when the one-dimensional first sensing information is produced.

In the embodiment, for obtaining smoother pressing trajectory and approximating trajectory, the program module is further used to perform the following steps: establishing a pressing trajectory and an approximating trajectory respectively according to the pressing positions and the approximating positions of the external object; and revising the pressing position getting from the last calculation according to the pressing trajectory and revising the approximating position getting from the last calculation according to the approximating trajectory.

In the embodiment, for saving power and sensing time and increasing sensing frequency, the program module is further used to perform the following steps: performing a prediction based on the pressing trajectory to obtain a pressing prediction area; performing a prediction based on the approximating trajectory to obtain an approximating prediction area; combining the pressing prediction area with the approximating prediction area to identify a prediction region that needs to be sensed; finding respectively a first electrode set, a second electrode set, and a third electrode set that the first electrodes, the second electrodes, and the third electrodes correspondingly relate to the prediction region; having the driving circuit respectively drive in turn multiple second electrodes in the second electrode set; having the sensing circuit respectively sense multiple first electrodes in the first electrode set to produce the one-dimensional first sensing information consisting of multiple first sensing information and respectively sense multiple third electrodes in the third electrode set to produce the one-dimensional third sensing information consisting of multiple third sensing information when each of the second electrode is driven; piecing each of the one-dimensional first sensing information corresponding to its corresponding second electrode together into the two-dimensional first sensing information and piecing each of the one-dimensional third sensing information together into the two-dimensional third sensing information after all the second electrodes in the second electrode set have been driven; and calculating the approximating position of an external object according to the two-dimensional first sensing information and calculating the pressing position of the external object according to the two-dimensional third sensing information.

In the embodiment, for reducing difficulty of design or itself EMI, the driving circuit respectively drives the second electrodes according to the following sequence: from bottom to top; from top to bottom; and randomly.

In the embodiment, for avoiding sending wrong key symbol due to wrong palm touch, the program module is further used to perform the following steps: finding out at least one palm touch area according to the two-dimensional first sensing information; and having the interface device not send the key symbol corresponding to the key area to the host when the reporting position is in the palm touch area.

In the embodiment, for providing the input function of an active stylus, the program module is further used to perform the following steps: having the sensing circuit respectively couple all the first electrodes and all the second electrodes to detect electrical signal emitted by an active stylus to produce an active stylus position according to detection result during an active stylus detection period; calculating a stylus reporting position according to the active stylus position or the pressing position that corresponds to the active stylus; and having the interface device send the stylus reporting position to the host.

In the embodiment, for more precisely providing active stylus pressing position, the stylus reporting position selects from one of the following: the pressing position; the active stylus position; a midpoint position between the pressing position and the active stylus position; and a weighted position between the pressing position and the active stylus position, wherein the weighted position is determined how far it is to the pressing position according to a pressure value of the active stylus.

In the embodiment, for providing the pressure value of the touch sensitive input device from the active stylus, a pressure sensor is installed on the active stylus for detecting a stylus pressure value, the electrical signal includes the stylus pressure value being modulated, wherein the program module is further used to perform the following steps: demodulating the electrical signal to obtain the stylus pressure value; calculating a modified pressure value according to the stylus pressure value or a pressure value detecting by the touch sensitive input device; and having the interface device send the modified pressure value to the host.

In the embodiment, for more precisely providing the pressure value of the touch sensitive input device from the active stylus, the modified pressure value selects from one of the following: the stylus pressure value; the pressure value; an average value of the stylus pressure value and the pressure value; and an average value of the stylus pressure value being weighted and the pressure value being weighted, wherein weighted weights change according to pressure gradient.

According to an embodiment of the present invention, it provides a touch sensitive processing method applying to a touch sensitive processing apparatus. Wherein the touch sensitive processing apparatus couples to a touch sensitive input device and a host. The touch sensitive input device includes multiple parallel first electrodes, multiple parallel second electrodes, multiple parallel third electrodes, and an elastic dielectric layer between the second and third electrodes. Wherein the touch sensitive input device includes a key zone, the key zone includes multiple key areas. Each of the first electrodes and the second electrodes form multiple approximation intersection areas in the key zone, each of the second electrodes and the third electrodes form multiple pressing intersection areas in the key zone, each of the key areas includes at least one of the approximation intersection areas and the pressing intersection areas. The touch sensitive processing method includes: having a driving circuit of the touch sensitive processing apparatus respectively drive the second electrodes in turn; having a sensing circuit of the touch sensitive processing apparatus respectively sense the first electrodes to produce a one-dimensional first sensing information consisting of multiple first sensing information and respectively sense the third electrodes to produce a one-dimensional third sensing information consisting of multiple third sensing information when each of the second electrodes is driven; piecing each of the one-dimensional first sensing information corresponding to its corresponding second electrode together into a two-dimensional first sensing information and piecing each of the one-dimensional third sensing information together into a two-dimensional third sensing information after all the second electrodes have been driven; calculating an approximating position of an external object according to the two-dimensional first sensing information and calculating a pressing position of the external object according to the two-dimensional third sensing information; calculating a reporting position according to the pressing position or the approximating position when the distance between the pressing position and the approximating position is within a range; determining whether the reporting position is in one of the key areas; and having the interface device send a key symbol corresponding to the key area into the host when the reporting position is in one of the key areas.

In the embodiment, for the touch sensitive input device to provide touch sensitive functions as well, the touch sensitive input device further includes a touch area. Each of the first electrodes and the second electrodes form multiple approximation intersection areas in the touch area. Wherein the touch sensitive processing method further includes: having the interface device send the approximating position to the host when the approximating position is in the touch area.

In the embodiment, for providing selections of touch area on different sizes, the relation between the touch area and the key zone selects from one of the following: the touch area including the key zone; and the touch area and the key zone are not overlapped.

In the embodiment, for providing more accurate key position, the reporting position selects from one of the following: the pressing position; the approximating position; a midpoint position between the pressing position and the approximating position; and a weighted position between the pressing position and the approximating position, wherein the weighted position is determined how far it is to the pressing position according to a pressure value of the external object.

In the embodiment, for avoiding wrong touch(es) causing wrong key reporting event(s), the touch sensitive processing method further including: having the interface device send a key symbol corresponding to a key area into the host when the reporting position is in the key area and a pressure value of the external object is further determined it is bigger than a key pressure threshold.

In the embodiment, for avoiding wrong touch(es) causing wrong key reporting event(s), the pressure value is calculated according to one of the following: a sum of multiple third sensing information near the pressing position those are larger than a third threshold value; one of the third sensing information that is closest to the pressing position; a sum of multiple third sensing information those correspond to multiple first sensing information near the approximating position corresponding to the pressing position those are larger than a first threshold value; and a sum of multiple third sensing information near the approximating position corresponding to the pressing position.

In the embodiment, for providing better service of key symbol output that higher sampling frequency is required, the frequency of calculating the reporting position is higher than that of sending the key symbol to the host.

In the embodiment, for providing thinner touch sensitive input device, the first electrodes and the second electrodes are on the same electrode layer, the third electrodes comparing with the second electrodes are closer to the external object.

In the embodiment, for providing thinner touch sensitive input device, the first electrodes and the third electrodes are respectively above/below the upside and the downside of the second electrodes, the first electrodes comparing with the third electrodes are closer to the external object.

In the embodiment, for shielding off the outside electromagnetic interference (EMI), the touch sensitive processing method further includes: having all the first electrodes be grounded or connect to a direct current voltage when the one-dimensional third sensing information is produced.

In the embodiment, for shielding off the outside EMI, the touch sensitive processing method further includes: having all the third electrodes be grounded or connect to a direct current voltage when the one-dimensional first sensing information is produced.

In the embodiment, for obtaining smoother pressing trajectory and approximating trajectory, the touch sensitive processing method further includes: establishing a pressing trajectory and an approximating trajectory respectively according to the pressing positions and the approximating positions of the external object; and revising the pressing position getting from the last calculation according to the pressing trajectory and revising the approximating position getting from the last calculation according to the approximating trajectory.

In the embodiment, for saving power and sensing time and increasing sensing frequency, the touch sensitive processing method further includes: performing a prediction based on the pressing trajectory to obtain a pressing prediction area; performing a prediction based on the approximating trajectory to obtain an approximating prediction area; combining the pressing prediction area with the approximating prediction area to identify a prediction region that needs to be sensed; finding respectively a first electrode set, a second electrode set, and a third electrode set that the first electrodes, the second electrodes, and the third electrodes correspondingly relate to the prediction region; having the driving circuit respectively drive in turn multiple second electrodes in the second electrode set; having the sensing circuit respectively sense multiple first electrodes in the first electrode set to produce the one-dimensional first sensing information consisting of multiple first sensing information and respectively sense multiple third electrodes in the third electrode set to produce the one-dimensional third sensing information consisting of multiple third sensing information when each of the second electrode is driven; piecing each of the one-dimensional first sensing information corresponding to its corresponding second electrode together into the two-dimensional first sensing information and piecing each of the one-dimensional third sensing information together into the two-dimensional third sensing information after all the second electrodes in the second electrode set have been driven; and calculating the approximating position of an external object according to the two-dimensional first sensing information and calculating the pressing position of the external object according to the two-dimensional third sensing information.

In the embodiment, for reducing difficulty of design or itself EMI, the driving circuit respectively drives the second electrodes according to the following sequence: from bottom to top; from top to bottom; and randomly.

In the embodiment, for avoiding sending wrong key symbol due to wrong palm touch, the touch sensitive processing method further includes: finding out at least one palm touch area according to the two-dimensional first sensing information; and having the interface device not send the key symbol corresponding to the key area to the host when the reporting position is in the palm touch area.

In the embodiment, for providing the input function of an active stylus, the touch sensitive processing method further includes: having the sensing circuit respectively couple all the first electrodes and all the second electrodes to detect electrical signal emitted by an active stylus to produce an active stylus position according to detection result during an active stylus detection period; calculating a stylus reporting position according to the active stylus position or the pressing position that corresponds to the active stylus; and having the interface device send the stylus reporting position to the host.

In the embodiment, for more precisely providing active stylus pressing position, the stylus reporting position selects from one of the following: the pressing position; the active stylus position; a midpoint position between the pressing position and the active stylus position; and a weighted position between the pressing position and the active stylus position, wherein the weighted position is determined how far it is to the pressing position according to a pressure value of the active stylus.

In the embodiment, for providing the pressure value of the touch sensitive input device from the active stylus, a pressure sensor is installed on the active stylus for detecting a stylus pressure value, the electrical signal includes the stylus pressure value being modulated, wherein the touch sensitive processing method further includes: demodulating the electrical signal to obtain the stylus pressure value; calculating a modified pressure value according to the stylus pressure value or a pressure value detecting by the touch sensitive input device; and having the interface device send the modified pressure value to the host.

In the embodiment, for more precisely providing the pressure value of the touch sensitive input device from the active stylus, the modified pressure value selects from one of the following: the stylus pressure value; the pressure value; an average value of the stylus pressure value and the pressure value; and an average value of the stylus pressure value being weighted and the pressure value being weighted, wherein weighted weights change according to pressure gradient.

According to the touch sensitive keyboard system, processing apparatus and method thereof provided by the present invention, they can provide a thinner touch sensitive input device which can output corresponding key symbol(s) after sensing the appropriate pressure(s). It can be avoided that soft touches of fingers cause the computer system to receive wrong instruction.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
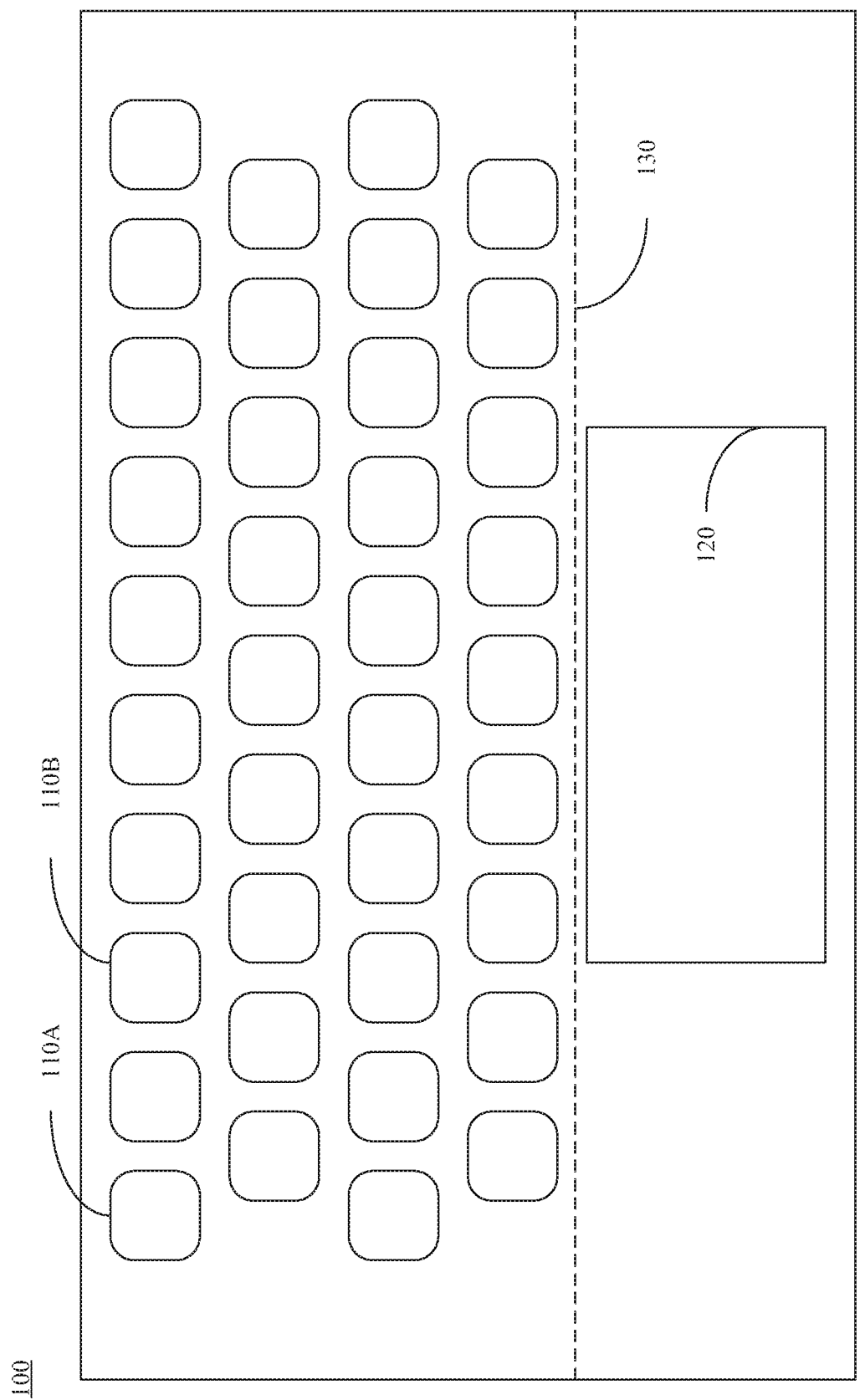
FIG. 1 shows a top view of a touch sensitive input device 100 according to an embodiment of the present invention.

Some embodiments of the present invention are described in detail below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

If any terms in this application conflict with terms used in any application(s) from which this application claims priority, or terms incorporated by reference into this application or the application(s) from which this application claims priority, a construction based on the terms as used or defined in this application should be applied.

Referring to FIG. 1, it shows a top view of a touch sensitive input device 100 according to an embodiment of the present invention. The touch sensitive input device 100 can be a thin and flat-shaped object that includes a multilayer structure from top to bottom, which can be used as a keyboard for laptops or for desktop computers. In one embodiment, the touch sensitive input device 100 can be constituted entirely by transparent object. Except for the indication of each key area displayed in a certain layer, the user can see through the touch sensitive input device 100. The key area labels may not necessarily need to be on the top layer. In another embodiment, the touch sensitive input device 100 can be translucent. In a transparent or translucent embodiment, the touch sensitive input device 100 may include more than one light-emitting component and/or its photoconductive component, providing uniform illumination to the user to see clearly the key area markings. In one embodiment, the touch sensitive input device 100 can be opaque, and the user can only see label of each key area on the top layer.

In FIG. 1, the touch sensitive input device 100 includes multiple key area labels 110, which can include the key areas 110A and 110B. Each key area label 110 can be used as a traditional keyboard to display the symbol represented by a key. In addition, a touch area 120 may further be included. In one embodiment, in a keyboard mode, the touch sensitive input device 100 ignores touch events except for the areas of the key area labels 110 and the touch area 120. In another embodiment, in a touchpad mode, the entire area of the touch sensitive input device 100 can be used as a touch panel.

Figure 2A:
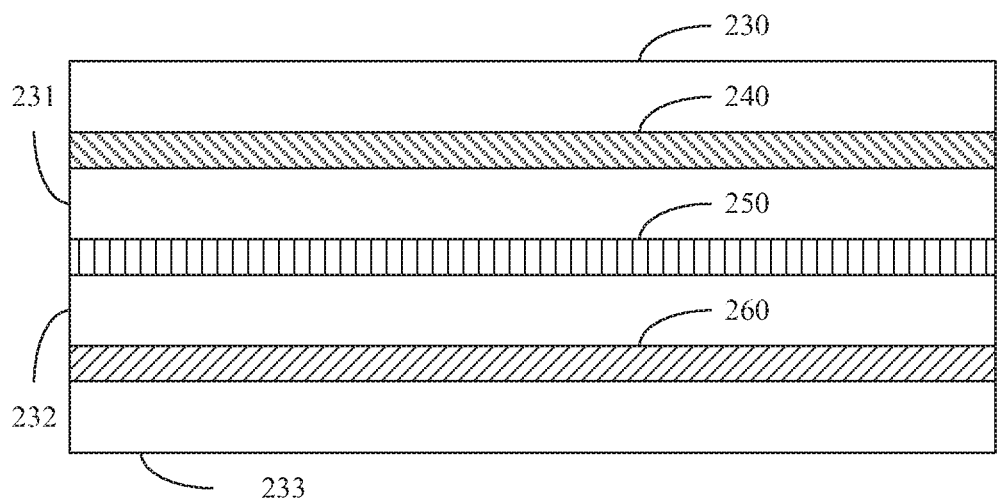
FIG. 2A shows a profile of a multilayer structure of a touch sensitive input device 100 according to the embodiment of the present invention.

Referring to FIG. 2A, it shows a profile of a multilayer structure of a touch sensitive input device 100 according to the embodiment of the present invention. The multilayer structure includes at least three electrode layers: a first electrode layer 240, a second electrode layer 250, and a third electrode layer 260, wherein the first electrode layer 240 is closest to finger. A first insulating layer 231 is sandwiched between the first electrode layer 240 and the second electrode layer 250. The first electrode layer 240 and the second electrode Layer 250 are completely affixed to the first insulating layer 231. The distance between the first electrode layer 240 and the second electrode layer 250 does not change under finger's normal pressing force. A second insulating layer 232 is sandwiched between the second electrode layer 250 and the third electrode layer 260. The second insulating layer 232 may be made of a more flexible material. At least, when the two insulating layers 231 and 232 are subjected to force, the deformation of the second insulating layer 232 is greater than that of the first insulating layer 231. The second insulating layer 232 will deform when the fingers normally apply, making the distance between the second electrode layer 250 and the third electrode layer 260 smaller.

On top of the first electrode layer 240, there is an insulating protective layer 230, which protects the first electrode layer 240 from being directly touched by the external object and the finger. The insulating protective layer 230 may also display multiple key area labels 110 and/or the touch area 120. Under the third electrode layer 260, an insulating protective layer 233 may also be included to protect the third electrode layer 260 from being directly touched by the external object. A metal layers may be included in the insulating protective layer 233, which is not connected to the third electrode layer 260. The metal layer can be composed of flaky, grid-like, or mesh metal and can be grounded or coupled to a DC potential to form a shield to avoid external electromagnetic signals below from the touch sensitive input device 100, especially interference with the third electrode layer 260.

The first electrode layer 240 includes multiple first electrodes or first conductive strips being parallel to a first direction. The second electrode layer 250 includes multiple second electrodes or second conductive strip being parallel to a second direction. In one embodiment, the first direction is perpendicular to the second direction. The third electrode layer 260 includes multiple parallel third electrodes or third conductive strips. In one embodiment, the multiple third electrodes are parallel to the first direction.

Figure 2B:
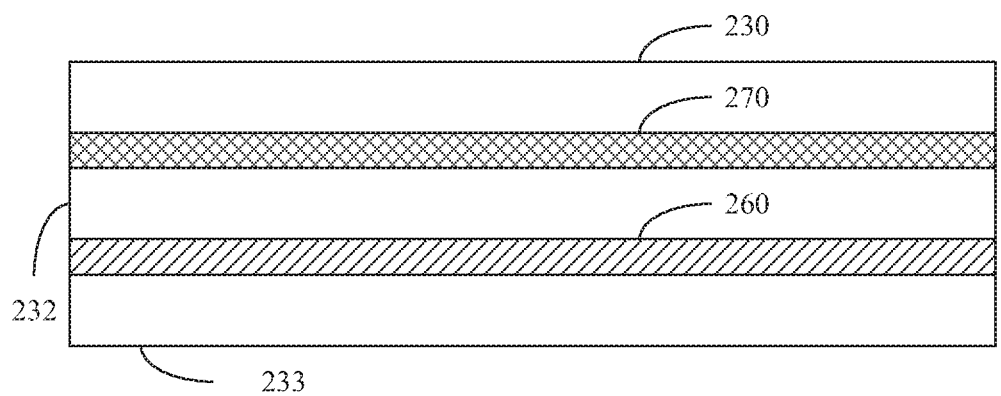
FIG. 2B shows a profile of a multilayer structure of the touch sensitive input device 100 according another embodiment of the present invention.

Referring to FIG. 2B, it shows a profile of a multilayer structure of the touch sensitive input device 100 according another embodiment of the present invention. The embodiment of FIG. 2B has no three electrode layers but only two electrode layers, a fourth electrode layer 270 and a third electrode layer 260. Since the embodiment of FIG. 2B does not have the first electrode layer 240 and the second electrode layer 250, there is no the first insulating layer 231 either. The fourth electrode layer 270 includes multiple first electrodes or first conductive strips being parallel to a first direction, and multiple second electrodes or second conductive strips being parallel to a second direction. Each first electrode and the multiple second electrodes form intersections, which can be achieved by the form of jumper or bridging, so that the multiple first electrodes and multiple second electrodes are at the same fourth electrode layer 270. In the case of the finger's normal force use, although the fourth electrode layer 270 will produce deformation, but the distance between each first electrode and the multiple second electrodes will almost not change. And, the second insulating layer 232 will deform, so that the distance between the fourth electrode layer 270 and the third electrode layer 260 will change, that is, the distance between the second electrode and the third electrode will change accordingly.

In one embodiment, the number of the first electrodes is the same as that of the third electrodes. The first electrodes and the third electrodes are located at the corresponding positions on the upper and the lower layers of the multilayer structure, respectively. That is, the intersections of a certain second electrode with the first electrodes above and with the third electrodes below are at the corresponding positions on the upper and the lower layers of the multilayer structure, respectively. In one embodiment, the number of the first electrodes is different from that of the third electrodes. The first electrodes and the third electrodes are not located at the corresponding positions on the upper and the lower layers of the multilayer structure, respectively. That is, the intersections of a certain second electrode with the first electrodes above and the third electrodes below are not at the corresponding positions on the upper and the lower layers of the multilayer structure, respectively.

In one embodiment, each of the key area labels 110 shown in FIG. 1 shall include at least one intersection of the first electrode and the second electrode and at least one intersection of the first electrode and the third electrode. Each of the touch areas 120 shown in FIG. 1 shall include at least one intersection of the first electrode and the second electrode.

In the embodiments of FIGS. 2A and 2B, the multiple first electrodes, second electrodes, and third electrodes are respectively connected to a touch sensitive processing apparatus. These electrodes can be clustered on surface of at least one flexible board and connected to the touch sensitive processing apparatus inside an electronic system. The touch sensitive processing apparatus can be connected to the central processing unit of the electronic system through a proprietary or common industrial standard interface.

Figure 3:
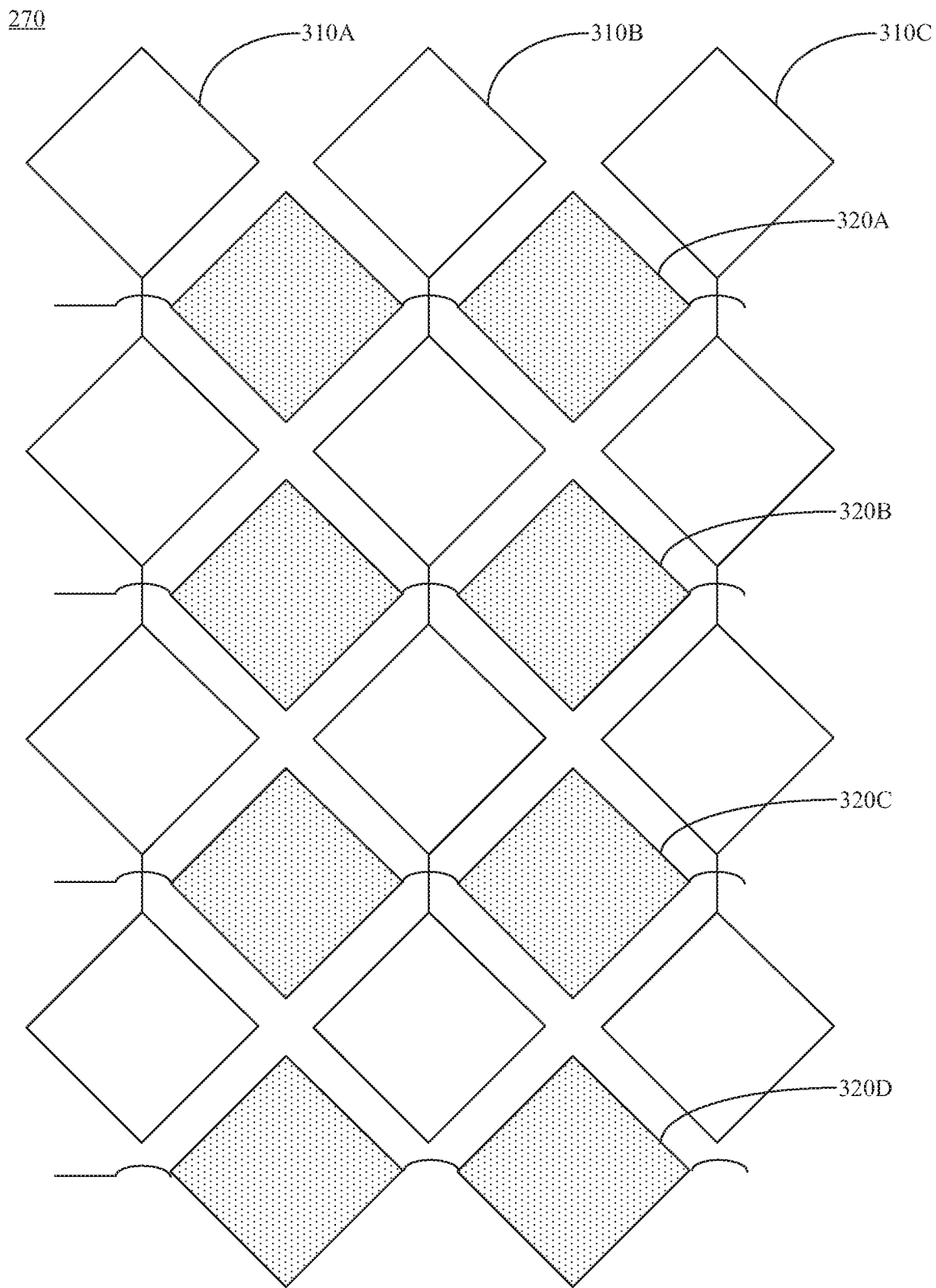
FIG. 3 shows a top view of a fourth electrode layer 270 in accordance with an embodiment.

Referring to FIG. 3, it shows a top view of a fourth electrode layer 270 in accordance with an embodiment. The fourth electrode layer 270 includes multiple first electrodes 310 being parallel to a first direction and multiple second electrodes 320 being parallel to a second direction. FIG. 3 shows three parallel first electrode 310A-C and four parallel second electrodes 320A-D. At the intersections of each of the second electrodes 320 with the first electrodes, jumpers are used to connect each electrode piece of the second electrodes 320. These electrode pieces can be rhombic, square or hexagonal. In the embodiments of FIGS. 2A and 2B, the pattern and the design of the first electrodes and the third electrodes can be the same or different. The pattern and the design at least include the spacing between the electrodes, the electrode shape, the electrode material, and so on.

Figure 4A:
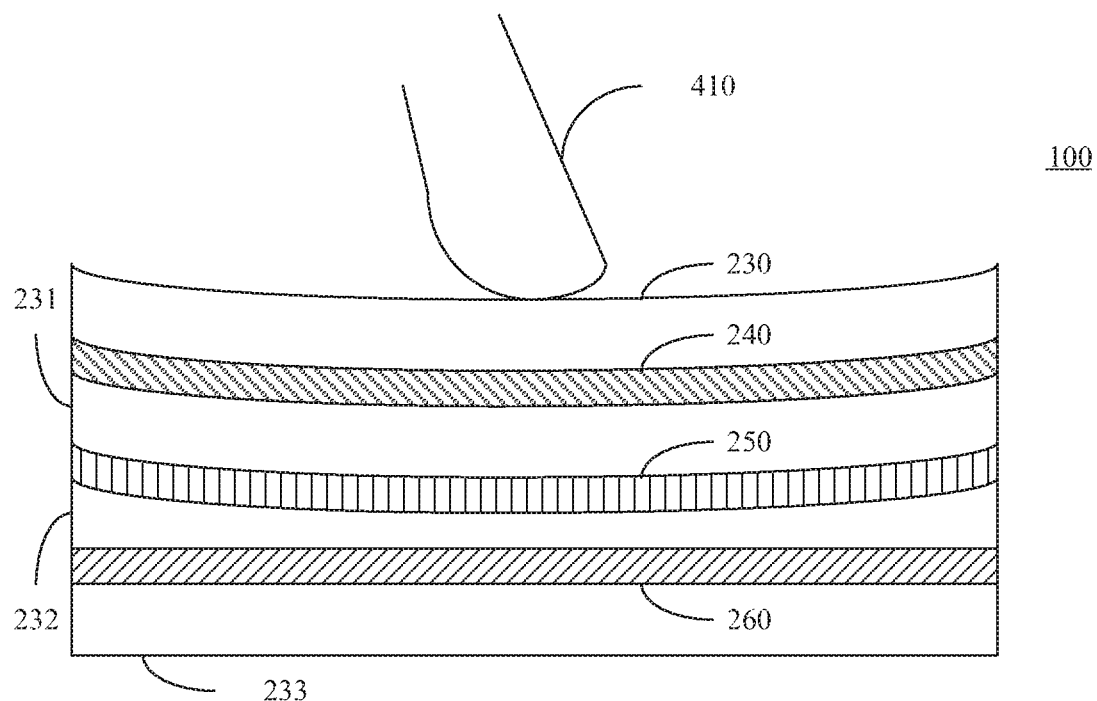
FIG. 4A shows a sectional view of the multilayer structure of the touch sensitive input device shown in FIG. 2A being pressed by a finger.

Referring to FIG. 4A, it shows a sectional view of the multilayer structure of the touch sensitive input device shown in FIG. 2A being pressed by a finger. When a finger 410 or an external conductive object presses the touch sensitive input device 100, the distance between the first electrode layer 240 and the second electrode layer 250 does not change because the first electrode layer 240 and the second electrode Layer 250 are completely affixed to the first insulating layer 250. However, the second insulating layer 232 will deform so that the distance between the second electrode layer 250 and the third electrode layer 260 changes.

Figure 4B:
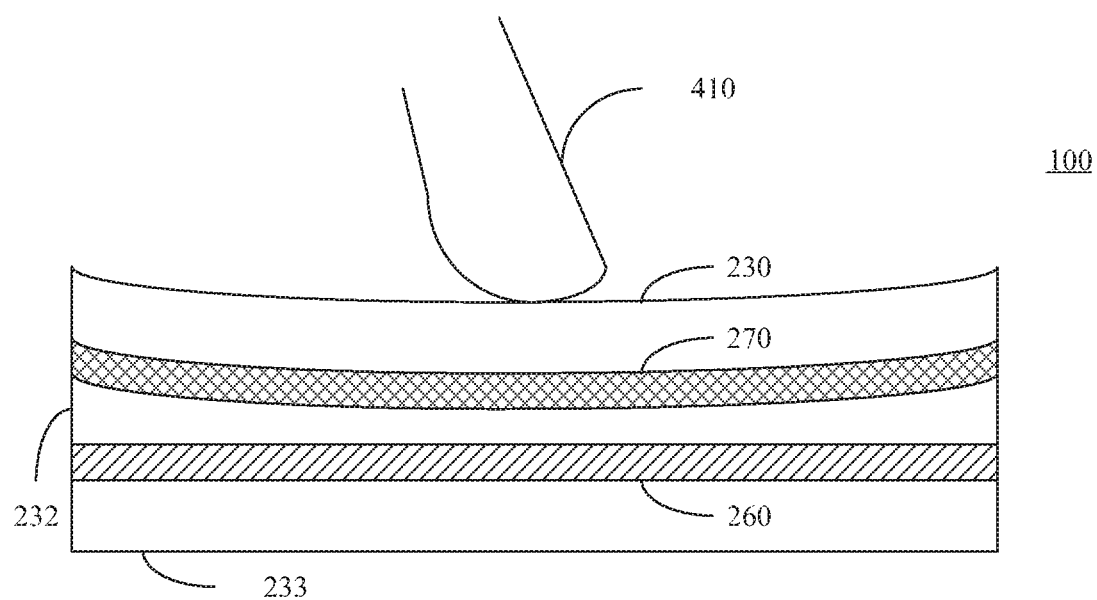
FIG. 4B shows a sectional view of the multilayer structure of the touch sensitive input device shown in FIG. 2B being pressed by the finger.
Figure 4C:
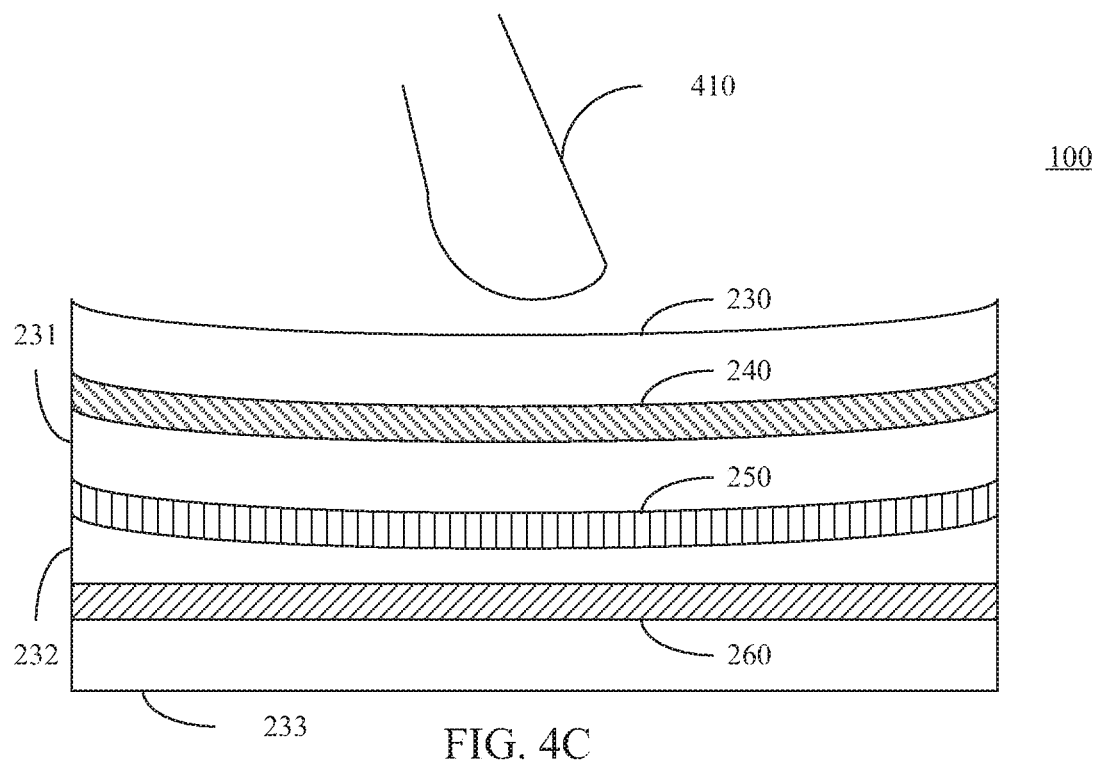
FIG. 4C shows a sectional view of the multilayer structure of the touch sensitive input device shown in FIG. 2A after being pressed by the finger.

Referring to FIG. 4C, it shows a sectional view of the multilayer structure of the touch sensitive input device shown in FIG. 2A after being pressed by the finger. The distance between the first electrode layer 240 and the second electrode layer 250 does not change after the finger 410 or the external conductive object presses and leaves the touch sensitive input device 100, because the first electrode layer 240 and the second electrode Layer 250 are completely affixed to the first insulating layer 231. However, the deformation of the second insulating layer 232 has not yet been restored, making the distance between the second electrode layer 250 and the third electrode layer 260 still different from the embodiment shown in FIG. 2A.

Figure 4D:
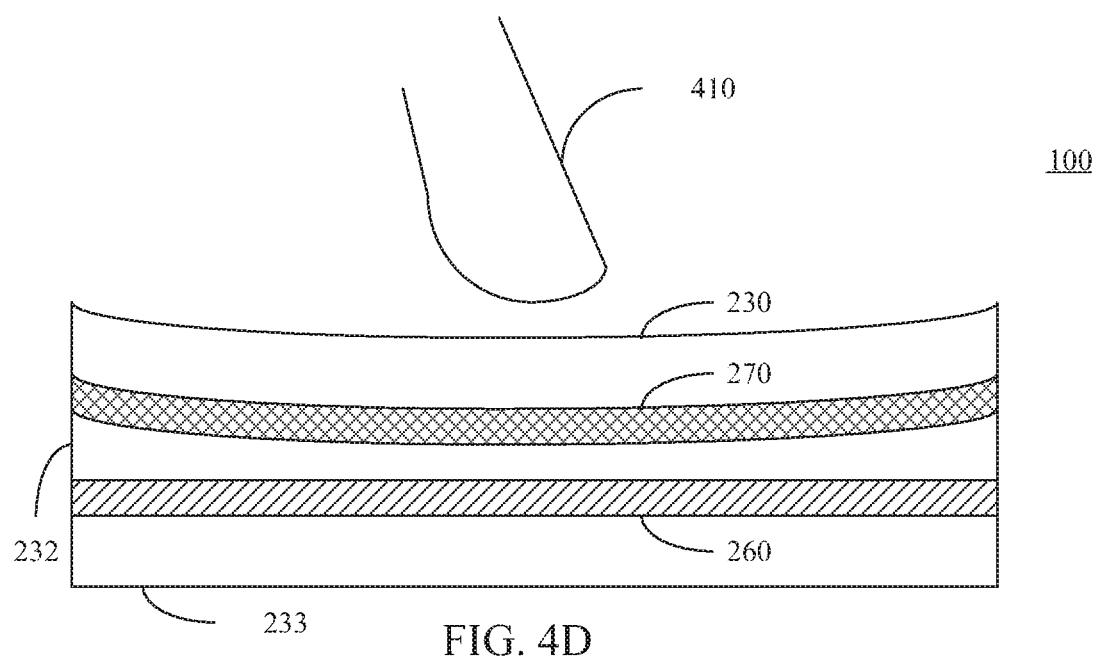
FIG. 4D shows a sectional view of the multilayer structure of the touch sensitive input device shown in FIG. 2B after being pressed by the finger.
Figure 4E:
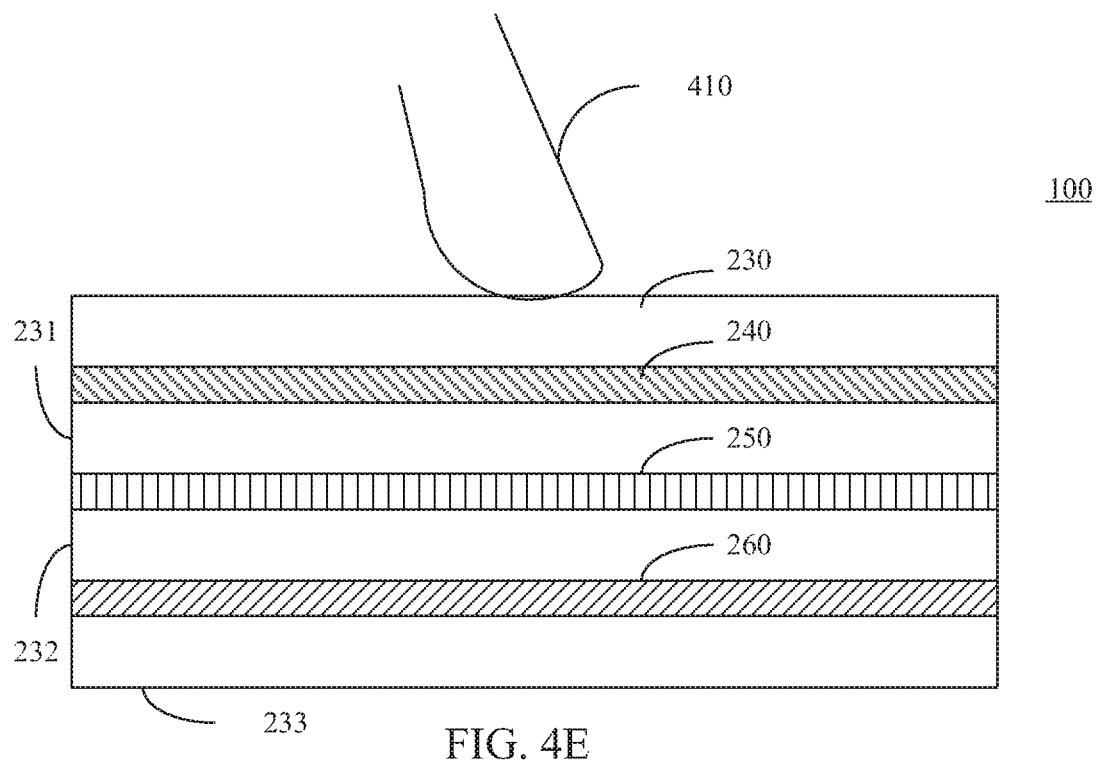
FIG. 4E shows a sectional view of the multilayer structure of the touch sensitive input device shown in FIG. 2A being gently touched by the finger.

Referring to FIG. 4E, it shows a sectional view of the multilayer structure of the touch sensitive input device shown in FIG. 2A being gently touched by the finger. The distance between the first electrode layer 240 and the second electrode layer 250 does not change when the finger 410 or the external conductive object touches the touch sensitive input device 100 gently, because the first electrode layer 240 and the second electrode layer 250 are completely affixed to the first insulating layer 231. Moreover, the second insulating layer 232 has not deformed or deformed very slightly, so the distance between the second electrode layer 250 and the third electrode layer 260 has not changed or has changed very slightly.

Referring to FIG. 4B, it shows a sectional view of the multilayer structure of the touch sensitive input device shown in FIG. 2B being pressed by the finger. When the finger 410 or the external conductive object presses the touch sensitive input device 100, the distance between the first electrode 310 and the second electrode 320 does not change or changes slightly, because the first electrode 310 and the second electrode 320 are at the same fourth electrode layer 270. However, the second insulating layer 232 will deform so that the distance between the fourth electrode layer 270 and the third electrode layer 260 changes.

Referring to FIG. 4D, it shows a sectional view of the multilayer structure of the touch sensitive input device shown in FIG. 2B after being pressed by the finger. The distance between the first electrode 310 and the second electrode 320 does not change or changes slightly when the finger 410 or the external conductive object presses and leaves the touch sensitive input device 100, since the first electrode 310 and the second electrode 320 are at the same fourth electrode layer 270. However, the deformation of the second insulating layer 232 has not yet been restored, making the distance between the fourth electrode layer 270 and the third electrode layer 260 still different from the embodiment shown in FIG. 2B.

Figure 4F:
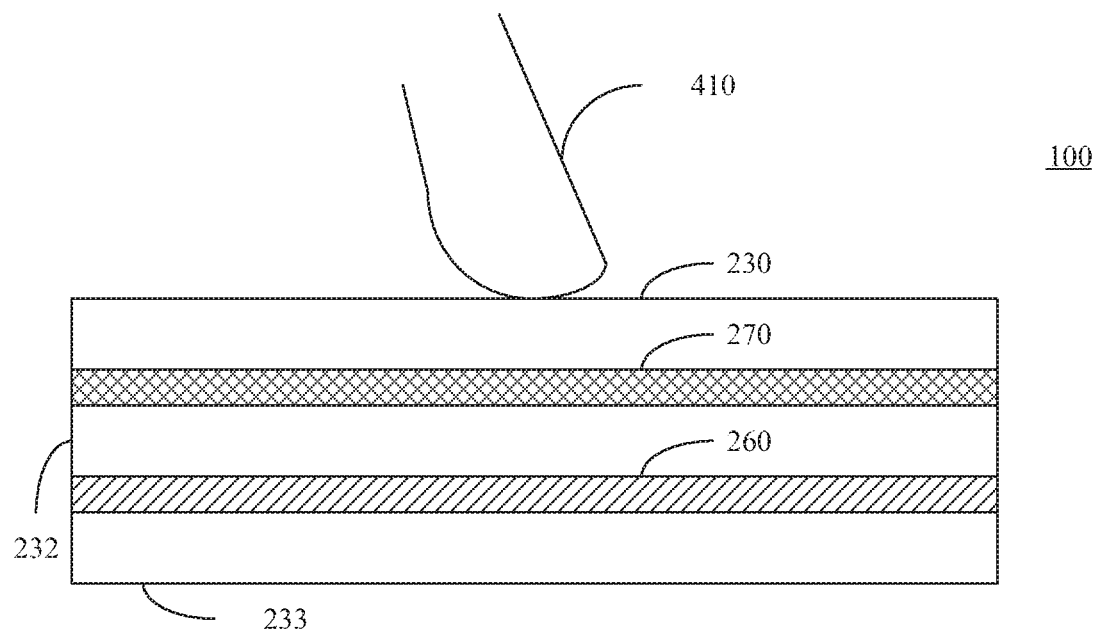
FIG. 4F shows a sectional view of the multilayer structure of the touch sensitive input device shown in FIG. 2B being gently touched by the finger.

Referring to FIG. 4F, it shows a sectional view of the multilayer structure of the touch sensitive input device shown in FIG. 2B being gently touched by the finger. When the finger 410 or the external conductive object touches the touch sensitive input device 100 gently, the distance between the first electrode 310 and the second electrode 320 does not change, because the first electrode 310 and the second electrode 320 are at the same fourth electrode layer 270. Furthermore, the second insulating layer 232 has not deformed or deformed very gently, so that the distance between the fourth electrode layer 270 and the third electrode layer 260 has not changed or has changed very gently.

According to an embodiment of the present invention, a touch sensitive processing apparatus may include a driving circuit, a sensing circuit and an embedded processor connected to the driving circuit and the sensing circuit. The driving circuit can connect to each of the second electrodes through a configurable interconnection network, and the sensing circuit can connect to each of the first electrodes and the third electrodes respectively through the configurable interconnection network. The embedded processor can execute a program or program module to execute touch sensitive related instructions and control the configurable interconnection network. The embedded processor may be Intel Corporation's i960 processor, 8051 processor, ARM's Cortex M-series processor, ARM7, ARMS processor, and so on. The driving circuit may include frequency signal generator, frequency adjustment circuit, voltage-voltage converter, signal amplifier and other circuits. The sensing circuit may include frequency signal generator, frequency adjustment circuit, integral circuit, analog-to-digital converter, variable resistor, signal amplifier and other circuits. A person having ordinary skill in the art can appreciate that the common practice of the driving circuit and the sensing circuit. There are already several billions of consumer electronic products having touch screen and touch panel, and their touch sensitive processing apparatus have the driving circuit and the sensing circuit mentioned above.

According to an embodiment of the present invention, the touch sensitive processing apparatus may implement a full-device sensing method for determining whether any approximate object is on the touch sensitive input device shown in FIG. 2A and FIG. 2B. In this embodiment, the touch sensitive processing apparatus may enable the driving circuit to connect all the second electrodes to emit a driving signal and enables the sensing circuit to connect all the first electrodes for sensing the driving signal sensed by each of first electrodes to produce multiple sensing signals corresponding to each of the first electrodes or called one-dimensional first sensing information. The touch sensitive processing apparatus can compare the one-dimensional first sensing information with a one-dimensional first base sensing information obtained when there is no external object approximating the touch sensitive input device, if the difference of any sensing value relative to the same first electrode is greater than a certain threshold, the object can be determined to be approximating or in contact with the touch sensitive input device.

In this embodiment, the sensing circuit may also be connected to all the third electrodes for sensing the driving signal sensed by each of the third electrodes to produce multiple sensing signals corresponding to each of the third electrodes or called one-dimensional third sensing information. The touch sensitive processing apparatus can compare the one-dimensional third sensing information with a one-dimensional third base sensing information obtained when there is no external object near the touch sensitive input device, if the difference of any sensing value relative to the same third electrode is greater than a certain threshold, it can be determined that the object exerts pressure on the touch sensitive input device.

In other words, the touch sensitive processing apparatus can make the sensing circuit produce one-dimensional first sensing information or one-dimensional third sensing information, merely. They are compared with the one-dimensional first base sensing information or the one-dimensional third base sensing information, respectively, to determine whether there are external objects approximating or touching to the touch sensitive input device.

The touch sensitive processing apparatus may also make the sensing circuit produce one-dimensional first sensing information and one-dimensional third sensing information at the same time and compare them with the one-dimensional first base sensing information and the one-dimensional third base sensing information, respectively. When the one-dimensional first base sensing information is inconsistent with the one-dimensional first sensing information, and the one-dimensional third base sensing information is consistent with the one-dimensional third sensing information, the external object can be determined to be approximating or touching the touch sensitive input device, but the external object does not press on the touch sensitive input device.

In the full-device sensing method, the sensing of all the first electrodes and all the third electrodes are performed during the driving signal being sent to all the second electrodes at once. Besides, the sensing of all the first electrodes and all the third electrodes are performed at two times during the driving signal is sent to all the first electrodes and all the third electrodes to obtain the one-dimensional first sensing information and the one-dimensional third sensing information, respectively.

Since the time required to perform the full-device sensing method is shorter, it can be used to quickly detect whether an external object approximates or presses the touch sensitive input device. When the external object is detected, additional precise position detection can be performed. When the external object is not detected, the touch sensitive processing apparatus can go into a more power-saving mode until the next sensing activity at a longer interval.

According to an embodiment of the present invention, the touch sensitive processing apparatus may implement the mutual capacitance sensing method for determining the position of the approximating or touching object on the touch sensitive input device as shown in FIG. 2A and FIG. 2B. The touch sensitive processing apparatus can make the driving circuit connect all the second electrodes in turn sequentially or not sequentially to emit a driving signal respectively. When each second electrode emits a driving signal, the sensing circuit can be enabled to simultaneously sense the driving signal through each first electrode and each third electrode to produce one-dimensional first sensing information and one-dimensional third sensing information correspondingly. After all the second electrodes have already emitted the driving signals, all the one-dimensional first sensing information corresponding to their corresponding second electrodes is pieced together into a two-dimensional first sensing information. And, all the one-dimensional third sensing information corresponding to their corresponding third electrodes is pieced together into a two-dimensional third sensing information. Then, according to the two-dimensional first sensing information, an approximating or touching position of at least one external object is calculated, and a pressing position of the external object is calculated according to the two-dimensional third sensing information.

In one embodiment, the touch sensitive processing apparatus may correlate the touch position with the approximate position that they correspond to the same external object. When the distance between the pressing position and the approximating or touching position is within a certain range, the two positions can be correlated.

When the pressing position has a corresponding approximating or touching position, it may be considered as that shown in FIG. 4A or 4B, the external object presses the touch sensitive input device. In an optional step, the touch sensitive processing apparatus may further determine a reporting position corresponding to the pressing position and the approximating or touching position. The reporting position may be the pressing position, it may be the approximating or touching position, or the midpoint position between the two positions. Or a weighted value based on the pressure value of the external object is used to determine a weighted position between the two positions to act as the reporting position. Then, the touch sensitive processing apparatus determines whether the reporting position is in a key area, and if so, the key symbol corresponding to the key area is inputted into a host. If the reporting position is not in a key area, the key symbol associated with the key area is not inputted into the host. In addition, the touch sensitive processing apparatus can further determine whether the approximating or touching position falls in the touch area 120 of FIG. 1, and if so, it can be inputted into a host with other information. For example, the velocity of the approximating or touching trajectory, or the coordinate of the approximating or touching position that is converted to a relative position coordinate of the touch area 120.

Since the point-reporting rate may be higher than the rate of keyboard input, the touch sensitive processing apparatus can enter the key symbol associated with the key area to the host at the rate of keyboard input when the reporting position is in the same key area. For example, the touch sensitive processing apparatus has a point-reporting rate of 60 per second for the touch sensitive input device, and the touch sensitive processing apparatus that simulates the keyboard has an input rate of 30 times per second to the host. In other words, when there are two times of point-reported position in a continuous detection in a certain key area, the touch sensitive processing apparatus outputs only one key sign to the host.

When a corresponding approximating or touching position cannot be found according to the pressing position, it may be considered as that shown in FIG. 4C or 4D, the external object leaves the surface of the touch sensitive input device after pressing the touch sensitive input device. The touch sensitive processing apparatus does not need to enter the key symbol corresponding to the touch position to the host.

When a corresponding pressing position cannot be found according to the approximating or touching position, it may be considered as that shown in FIG. 4E or 4F, the external object does not touch the touch sensitive input device but approximates to its surface. The touch sensitive processing apparatus can further determine whether the approximating or touching position falls within the touch area 120 of FIG. 1, and if so, it can be entered into a host with other information. For example, the velocity of the approximating or touching trajectory, or the coordinate of the approximating or touching position that is converted to the relative position coordinates of the touch area 120.

If the pressing position and/or the approximating or touching position are/is detected, a pressure value can be calculated according to the third sensing information near the touch position. In an example, all the sensing values of the third sensing information near the pressing position those are larger than a threshold value can be summed as the pressure value. In another example, the one of the third sensing information value being closest to the pressing position can be used as the pressure value. In one example, the values of the third sensing information that correspond to the values of the first sensing information near the approximating or touching position corresponding to the pressing position those are larger than a threshold value can be summed as the pressure value, that is, to calculate the total pressure of the touch area of the external object. In a further example, the third sensing information value near the approximating or touching position corresponding to the pressing position can be used as the pressure value. In some examples, the third sensing information values those are located within a radius of the pressing position can be summed as the pressure value. In other examples, the third sensing information values those are within a radius of the approximating or touching position corresponding to the pressing position can be summed as the pressure value. In one embodiment, when the pressure value exceeds a key pressure threshold, the touch sensitive processing apparatus enters the key symbol corresponding to the reporting position to the host.

In one embodiment, the touch sensitive processing apparatus can correspondingly establish a pressing trajectory and an approximating or touching trajectory for the pressing positions and the approximating or touching positions that correspond to the same external object, so as to predict the pressing trajectory and the approximating or touching trajectory and to revise the reporting position operation prior to position reporting.

After the trajectory prediction, a pressing prediction area and an approximating or touching prediction area are obtained, and the touch sensitive processing apparatus can enter a mutual capacitance sensing method with a power-saving feature. In one embodiment, the touch sensitive processing apparatus can combine the pressing prediction area with the approximating or touching prediction area to identify a prediction region that needs to be sensed. Then, the sets of the first electrodes, the second electrodes and the third electrodes that correspond to the prediction region are found respectively. Then, the driving circuit is enabled to send a driving signal in turn to each second electrode of the second electrode set. At the same time, the sensing circuit is used to measure the first electrode set and the third electrode set respectively to produce one-dimensional first sensing information and one-dimensional third sensing information correspondingly. According to the order of the first electrodes and the third electrodes corresponding to the one-dimensional first sensing information and the one-dimensional third sensing information respectively, a two-dimensional first sensing information and a two-dimensional third sensing information of the prediction region are composed. Then, according to the two-dimensional first sensing information, an approximating or touching position of at least one external object is calculated, and a pressing position of the external object is calculated according to the two-dimensional third sensing information.

In the mutual capacitance sensing method mentioned above, each second electrode only emits one driving signal, and the two-dimensional first sensing information and the two-dimensional third sensing information are obtained. In one embodiment, the touch sensitive processing apparatus can enable each second electrode to emit two driving signals in time-sharing manner in order to sense the two-dimensional first sensing information and the two-dimensional third sensing information respectively. The present invention does not limit the sensing order of the two-dimensional first sensing information and the two-dimensional third sensing information. It is possible to collect the whole one-dimensional first sensing information prior to collecting the whole one-dimensional third sensing information, and then the two-dimensional first sensing information and the two-dimensional third sensing information are composed respectively. It is also possible to collect the whole one-dimensional third sensing information prior to collecting the whole one-dimensional first sensing information, and then the two-dimensional third sensing information and the two-dimensional first sensing information are composed respectively. It is still possible to collect a one-dimensional first sensing information, then to collect a one-dimensional third sensing information, and following this order in turn to collect the whole one-dimensional first sensing information and one-dimensional third sensing information separately. In one embodiment, it is not necessary to use the same second electrode to emit two consecutive driving signals to sense the one-dimensional first sensing information and the one-dimensional third sensing information respectively, two different second electrodes may be used to emit two consecutive driving signals to sense the one-dimensional first sensing information and the one-dimensional third sensing information separately. In other words, the one-dimensional first sensing information and the one-dimensional third sensing information that are measured by continuous sensing are not corresponding to the same second electrode.

For example, the touch sensitive processing apparatus may sequentially enable the second electrodes from top to bottom in turn to emit driving signals for sensing the one-dimensional first sensing information and successively enable the second electrodes from bottom to top in turn to emit a driving signal for sensing the one-dimensional third sensing information. Or, conversely, the touch sensitive processing apparatus may also allow the second electrodes from top to bottom in turn to sequentially emit driving signals for sensing the one-dimensional third sensing information and allow the second electrodes from bottom to top in turn to successively emit driving signals for sensing the one-dimensional first sensing information. In addition, the touch sensitive processing apparatus can randomly enable the second electrodes to emit driving signals in turn for sensing the one-dimensional first sensing information, and randomly enable the second electrodes to emit driving signals in turn for sensing the one-dimensional third sensing information. Through emitting the driving signal randomly, it can reduce the electromagnetic interference signals that produce a fixed period of interference with the electronic devices around.

In one embodiment, when the touch sensitive processing apparatus makes the driving circuit emit a driving signal to a second electrode, and when the sensing circuit is enabled to sense all the first electrodes to produce one-dimensional first sensing information, all the third electrodes can be grounded or connected to a direct current voltage to shield from the electromagnetic interference entered from below the touch sensitive input device. This embodiment can be applied to the touch sensitive input device 100 of FIGS. 2A and 2B.

In another embodiment, when the touch sensitive processing apparatus makes the driving circuit emit a driving signal to a second electrode, and when the sensing circuit is enabled to sense all the third electrodes to produce one-dimensional third sensing information, all the first electrodes can be grounded or connected to a direct current voltage to shield from the electromagnetic interference entered from above the touch sensitive input device. This embodiment can be applied to the touch sensitive input device 100 of FIG. 2A.

In one embodiment, the touch sensitive processing apparatus can find out at least one palm touch area according to the two-dimensional first sensing information. When a key area is associated to the at least one palm touch area, the touch sensitive processing apparatus does not send the key symbol to the host.

In one embodiment, the touch sensitive input device can be used as a traditional touch panel. In other words, the touch sensitive processing apparatus may not use the third electrodes for sensing. Therefore, in this mode of operation, all the third electrodes can be grounded or connected to a DC voltage to shield from the electromagnetic interference inputted from below the touch sensitive input device. This embodiment can be applied to the touch sensitive input device 100 of FIGS. 2A and 2B.

In one embodiment, the third electrode layer 260 or the third electrodes extends/extend only to all key areas to save costs because the non-key area does not need to detect pressure. For example, in the embodiment of FIG. 1, the third electrode layer 260 or all the third electrodes extends/extend from above to the key area below, that is, in the area above the dotted line 130. There is no third electrode layer 260 or third electrodes in the area below the dotted line 130. Therefore, the touch sensitive input device 100 can be changed back to a multilayer structure of only two electrode layers in the area below the dotted line 130, or a multilayer structure with a single electrode layer to accommodate the first electrodes and the second electrodes.

In one embodiment, the touch sensitive processing apparatus may detect the proximity, touching and pressing of an active stylus. By using the mechanism of the touch sensitive input device in a time-sharing manner, the touch sensitive processing apparatus can use the sensing circuit to detect the position of the stylus which emits electrical signal actively through the first electrodes and the second electrodes during an active stylus detection period. The present invention does not define the relative timing order of the active stylus detection period, the approximating or touching object detection period and the pressing object detection period, nor does it limit the quantity proportion and time proportion of each period.

In an embodiment of the active stylus detection period, the touch sensitive processing apparatus uses only the first electrodes and the second electrodes to detect the position of the stylus emitting electrical signal actively. In this mode of operation, all the third electrodes can be grounded or received a DC voltage to shield from the electromagnetic interference inputted from below the touch sensitive input device. This embodiment can be applied to the touch sensitive input device 100 of FIGS. 2A and 2B.

In the above embodiment, the touch sensitive processing apparatus can detect the active stylus position above and/or in all areas of the touch sensitive input device during the active stylus detection period; it can detect the fingers and palms that do not actively emit electrical signals by means of mutual capacitance sensing method during the approximating or touching object detection period; and it can detect any object that presses the touch sensitive input device through the mutual capacitance sensing method during the pressing object detection period. These three periods can respectively produce the active stylus position, the approximating or touching position and the pressing position.

In one embodiment, when there is only one pressing active stylus, and no finger approximating or touching the touch sensitive input device, a reporting position of the active stylus can be generated according to the position of the active stylus and its corresponding pressing position. The reporting position of the active stylus can be the pressing position, it can also be the position of the active stylus, or the midpoint between the two, or a weighted value based on a pressure value corresponding to the active stylus, which is used to determine a weighted position between the two to act as the reporting position.

In one embodiment, the active stylus and the touch object can be detected during the same period. During that period, the touch sensitive processing apparatus enables the driving circuit to emit third driving signals through all the third electrodes in turn, at the same time, the sensing circuit detects the third driving signal through all the second electrodes to produce one-dimensional third sensing information, and the one-dimensional third sensing information corresponds to the third driving signal. After all the third electrodes emit the third driving signals, all the one-dimensional third sensing information can be combined into two-dimensional third sensing information according to its corresponding third electrode. Accordingly, the touch sensitive processing apparatus can calculate the pressing position according to the two-dimensional third sensing information. The active stylus emits an active stylus driving signal during the same period, and the frequency of the active stylus driving signal is not the resonant frequencies with the frequency of the third driving signal. The touch sensitive processing apparatus can enable the sensing circuit to detect the active stylus driving signal through all the first electrodes and all the second electrodes, producing one-dimensional first sensing information and one-dimensional second sensing information respectively. Accordingly, the touch sensitive processing apparatus can calculate the position of the active stylus according to the one-dimensional first sensing information and the one-dimensional second sensing information.

In one embodiment, when a pressure sensor is installed on the active stylus for detecting a stylus pressure value, and the touch sensitive input device can obtain an input device pressure value during the pressing object detection period, a modified pressure value may be calculated according to the stylus pressure value and the input device pressure value. The modified pressure value can be the average of both, or the weighted average of both. Weighted weights may change according to the pressure gradient. For example, the weight of the stylus pressure sensor can be elevated when the measurement accuracy of the stylus pressure sensor is higher than that of the input device pressure value in a certain pressure range and/or a pressing position area. Conversely, the weight of the stylus pressure sensor can be lowered when the measurement accuracy of the stylus pressure sensor is lower than that of the input device pressure value in another pressure range and/or a touch position area. Accordingly, the accuracy of the pressure value can be increased by the measuring results of two pressure sensors.

Figure 5:
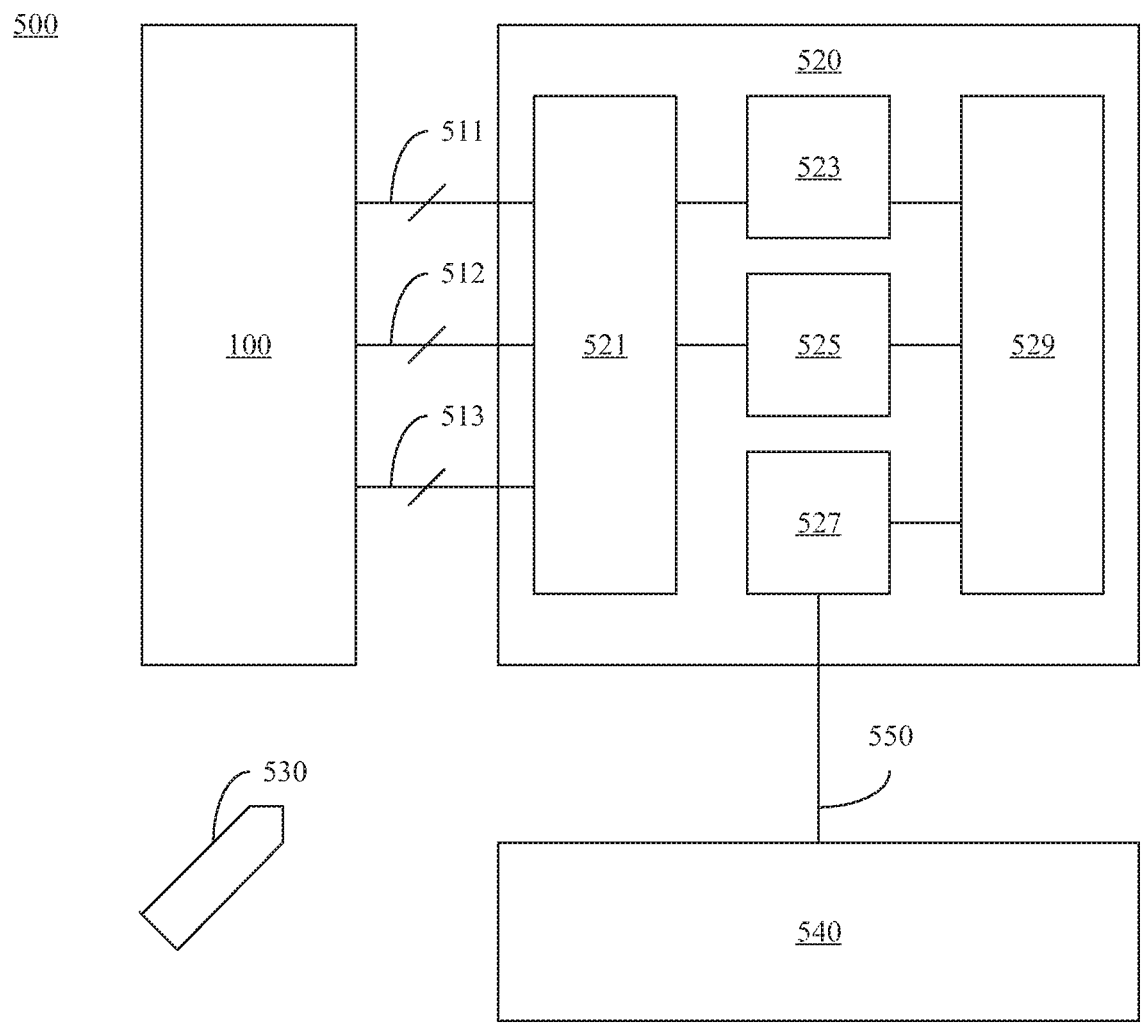
FIG. 5 shows a schematic block diagram of a touch sensitive keyboard system according to an embodiment of the present invention.

Referring to FIG. 5, it shows a schematic block diagram of a touch sensitive keyboard system 500 according to an embodiment of the present invention. The touch sensitive keyboard system 500 could be desktop computer, laptop computer, tablet computer, smart phone, and calculator likes. The touch sensitive keyboard system 500 includes a touch sensitive input device 100, a touch sensitive processing apparatus 520 controlling the touch sensitive input device 100, an active stylus 530 which can perform inputting via the touch sensitive input device 100, a host 550, and an interface 540 coupled to the host 550 and the touch sensitive processing apparatus 520.

The structure of the touch sensitive input device 100, as described earlier, includes multiple parallel first electrodes 511, multiple parallel second electrodes 512, and multiple parallel third electrodes 513. The touch sensitive processing apparatus 520 includes an interconnection network 521, a driving circuit 523, a sensing circuit 525, an interface device 527, and a processor 529. The interconnection network 521 controlled by the processor 529 is used to couple the driving circuit 523 to the multiple parallel second electrodes 512 and is used to couple the sensing circuit 525 to the multiple parallel first electrodes 511, the multiple parallel second electrodes 512, and multiple parallel third electrodes 513. The driving circuit 523 sends driving signal through the coupled second electrodes 512. The sensing circuit 525 receives the driving signal or electrical signal from the active stylus 530 through each of the coupled electrodes. The processor 529 could be an embedded processor which can execute a program or program module to execute touch sensitive related instructions and control the interconnection network 521. The processor 529 may be Intel Corporation's i960 processor, 8051 processor, ARM's Cortex M-series processor, ARM7, ARMS processor, and so on. The driving circuit 523 may include frequency signal generator, frequency adjustment circuit, voltage-voltage converter, signal amplifier and other circuits. The sensing circuit 525 may include frequency signal generator, frequency adjustment circuit, integral circuit, analog-to-digital converter, variable resistor, signal amplifier and other circuits.

The touch sensitive input device 100 and the touch sensitive processing apparatus 520 could be as an independent apparatus coupled to the host 550 through the interface device 527. The touch sensitive input device 100 may also combine a displayer/monitor together as a part of touch screen. The interface device 527 couples to the touch sensitive processing apparatus 520 and the host 550 through an interface 540. The interface 540 could be a common industrial standard interface, such as one of PS/2, RS-232, RS-422, IEEE 1394, USB, Wireless USB, Bluetooth, and so on. The interface 540 could also be a proprietary interface, such as Microsoft Corporation's magnetic connection interface used in Surface-series computer to connect keyboard. The processor 529, through the interface device 527, can send message to the host 550 through the interface 540. Conversely, the processor 529 can also receive the message transmitted from the host 550 through the interface device 527. The host 550 could be any forms of calculator which has an input system. The interface 540 is a part of the input system.

Figure 6A:
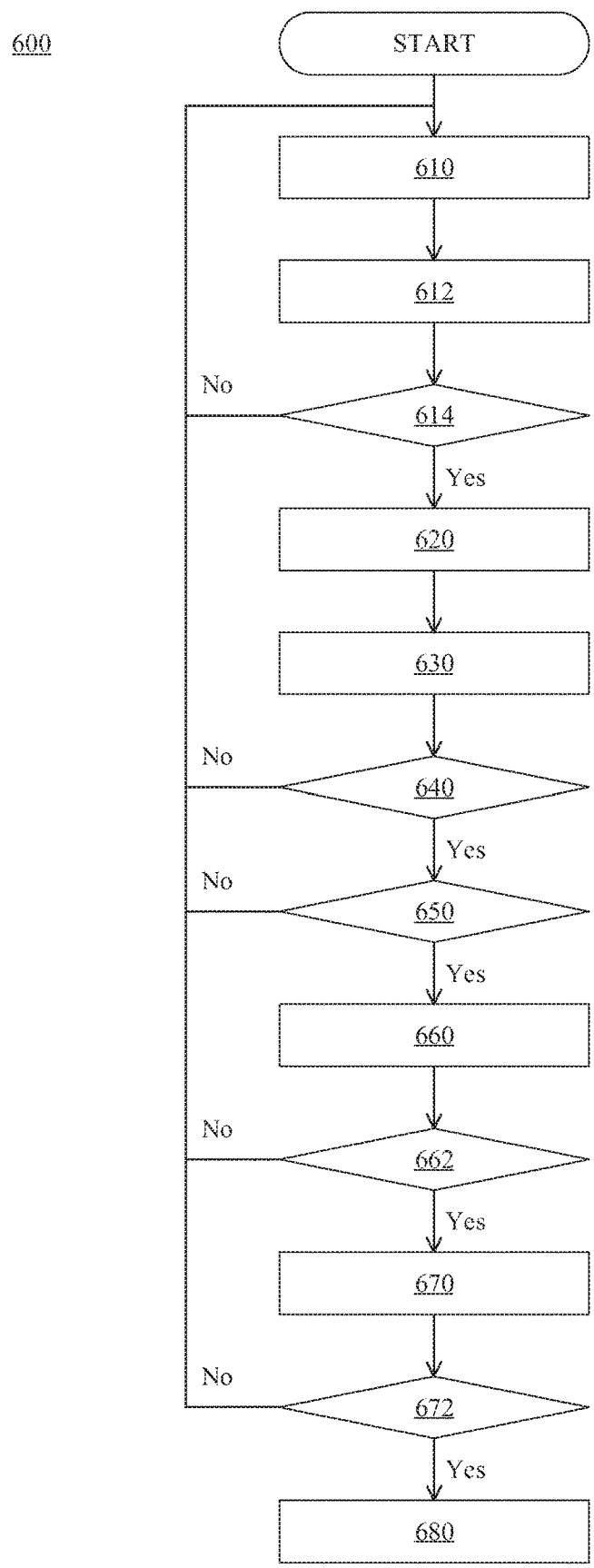
FIG. 6A shows a flowchart of a touch sensitive processing method 600 according to an embodiment of the present invention.

The processor 529 is used to execute a program or program module for performing a touch sensitive processing method. Referring to FIG. 6A, it shows a flowchart of a touch sensitive processing method 600 according to an embodiment of the present invention. The touch sensitive processing method 600 applies to the touch sensitive processing apparatus 520. The present application does not limit the sequencing of execution among these steps if there is no causal relationship between the steps, and other steps can also be inserted among the steps.

In step 610: having the driving circuit drive one of the second electrodes which have not been driven in the second electrodes, that is, providing driving signal to the second electrode and maybe once or twice. As being driven twice, multiple first sensing information and multiple third sensing information can be respectively produced. Further, the driving circuit respectively drives the second electrodes according to the following sequence: from bottom to top; from top to bottom; and randomly.

In step 612: having the sensing circuit respectively sense the first electrodes to produce a one-dimensional first sensing information consisting of multiple first sensing information and respectively sense the third electrodes to produce a one-dimensional third sensing information consisting of multiple third sensing information when each of the second electrodes is driven. The multiple first sensing information and the multiple third sensing information are respectively the sensing signals of the driving signal. In one embodiment, all the first electrodes are grounded or connect to a direct current voltage when the one-dimensional third sensing information is produced. In another embodiment, all the third electrodes are grounded or connect to a direct current voltage when the one-dimensional first sensing information is produced.

In step 614: determining whether all the second electrodes have been driven? If not, returning to the beginning of the process. When all the second electrodes have been driven, the process goes to step 620.

In step 620: piecing each of the one-dimensional first sensing information corresponding to its corresponding second electrode together into a two-dimensional first sensing information and piecing each of the one-dimensional third sensing information together into a two-dimensional third sensing information after all the second electrodes have been driven.

In step 630: calculating an approximating position of an external object according to the two-dimensional first sensing information and calculating a pressing position of the external object according to the two-dimensional third sensing information.

In step 640: calculating a reporting position according to the pressing position or the approximating position when the distance between the pressing position and the approximating position is within a range. Wherein the reporting position selects from one of the following: the pressing position; the approximating position; a midpoint position between the pressing position and the approximating position; and a weighted position between the pressing position and the approximating position, wherein the weighted position is determined how far it is to the pressing position according to a pressure value of the external object. If the pressing position and the approximating position cannot be known or the distance between two of them is larger than a range, the process returns to the beginning. Otherwise, the process goes to step 650.

In step 650: determining whether the reporting position is in one of the key areas. Optional step 660 is then performed when the reporting position is in a certain of the key areas, or step 670 or 680 is directly performed. Otherwise, returning to the beginning of the process.

In optional step 660: calculating a pressure value. The pressure value could be calculated according to one of the following: a sum of multiple third sensing information near the pressing position those are larger than a third threshold value; one of the third sensing information that is closest to the pressing position; a sum of multiple third sensing information those correspond to multiple first sensing information near the approximating position corresponding to the pressing position those are larger than a first threshold value; and a sum of multiple third sensing information near the approximating position corresponding to the pressing position.

In optional step 662: determining whether the pressure value of the external object is bigger than a key pressure threshold. The process goes to step 670 or 680 when the pressure value is bigger than the key pressure threshold. Otherwise, returning to the beginning of the process.

In optional step 670: finding out at least one palm touch area according to the two-dimensional first sensing information.

In optional step 672: determining whether the reporting position is outside the palm touch area. The process goes to step 680 when the reporting position is outside the palm touch area. Otherwise, returning to the beginning of the process.

In step 680: having the interface device send the key symbol corresponding to the key area to the host. Then, returning to the beginning of the process.

Figure 6B:
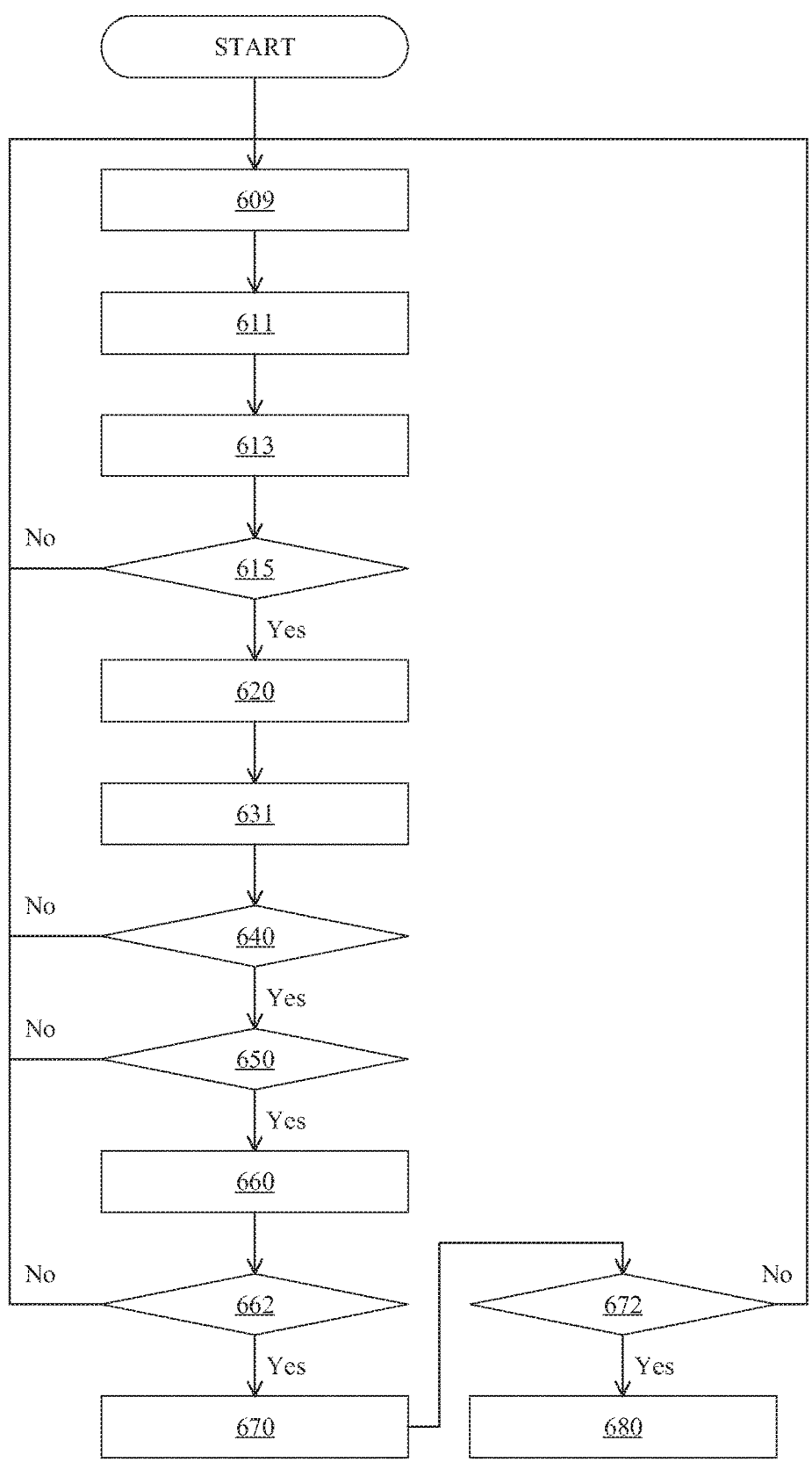
FIG. 6B shows a flowchart of the touch sensitive processing method 600 according to another embodiment of the present invention.

Referring to FIG. 6B, it shows a flowchart of the touch sensitive processing method 600 according to another embodiment of the present invention. If there have no other explanations, the steps performed in FIG. 6B are like those performed in FIG. 6A. The process in FIG. 6B is to save power and sensing time and to increase sensing frequency. It is not necessary to drive all the second electrodes according to the trajectory data.

In step 609: performing a prediction based on the pressing trajectory consisting of multiple pressing positions to obtain a pressing prediction area; performing a prediction based on the approximating trajectory consisting of multiple approximating positions to obtain an approximating prediction area; combining the pressing prediction area with the approximating prediction area to identify a prediction region that needs to be sensed; finding respectively a first electrode set, a second electrode set, and a third electrode set that the first electrodes, the second electrodes, and the third electrodes correspondingly relate to the prediction region.

In step 611: having the driving circuit drive one of the second electrodes which have not been driven in the second electrode set, that is, providing driving signal to the second electrode and maybe once or twice. As being driven twice, multiple first sensing information and multiple third sensing information can be respectively produced. Further, the driving circuit respectively drives the second electrode set according to the following sequence: from bottom to top; from top to bottom; and randomly.

In step 613: having the sensing circuit respectively sense multiple first electrodes in the first electrode set to produce the one-dimensional first sensing information consisting of multiple first sensing information and respectively sense multiple third electrodes in the third electrode set to produce the one-dimensional third sensing information consisting of multiple third sensing information when each of the second electrode is driven.

In step 615: determining all the second electrodes in the second electrode set have been driven? If not, returning to the beginning of the process. When all the second electrodes have been driven, the process goes to step 620.

In step 631: calculating the approximating position of an external object according to the two-dimensional first sensing information and calculating the pressing position of the external object according to the two-dimensional third sensing information; establishing a pressing trajectory and an approximating trajectory respectively according to the pressing positions and the approximating positions of the external object; and revising the pressing position getting from the last calculation according to the pressing trajectory and revising the approximating position getting from the last calculation according to the approximating trajectory.

Figure 7:
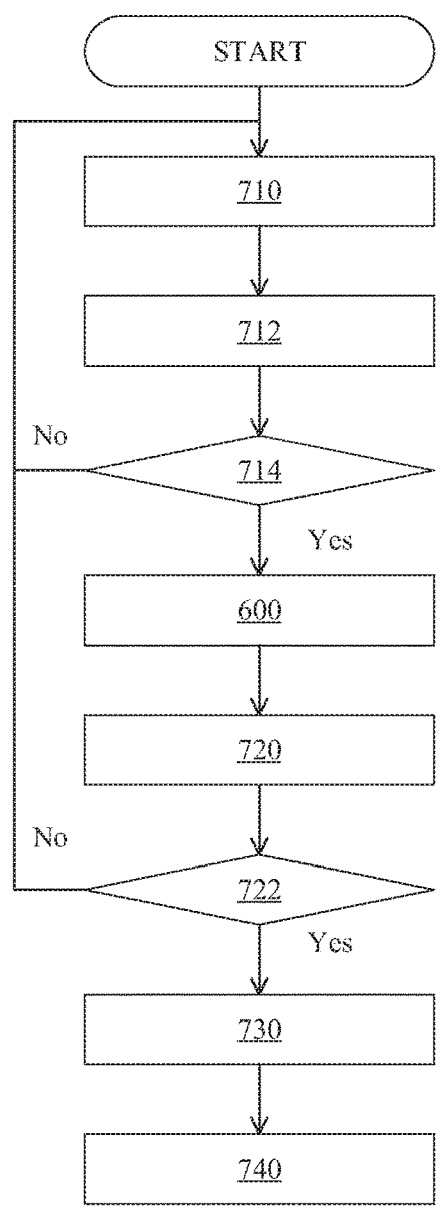
FIG. 7 shows a flowchart of a touch sensitive processing method 700 according to an embodiment of the present invention.

Referring to FIG. 7, it shows a flowchart of a touch sensitive processing method 700 according to an embodiment of the present invention. The touch sensitive processing method 700 applies to the touch sensitive processing apparatus 520. The present invention does not limit the sequencing of execution among these steps if there is no causal relationship between the steps, and other steps can be inserted among the steps. The touch sensitive processing method 700 is built on the foundation of the touch sensitive processing method 600, and thus each step is optional.

Before performing the touch sensitive processing method 600, a quickly detecting for determining whether any external object presses or approximates the touch sensitive input device is first performed. If any external object is detected, the touch sensitive processing method 600 is then performed. Moreover, before, after, or during the touch sensitive processing method 600 is performed, an active stylus's detection could be performed and the position and/or the pressure of the active stylus can be reported back.

In step 710: having the driving circuit simultaneously drive all the second electrodes.

In step 712: having the sensing circuit simultaneously respectively sense the first electrodes to produce a whole-input-device first sensing information consisting of multiple first sensing information and/or respectively sense the third electrodes to produce a whole-input-device third sensing information consisting of multiple third sensing information during performing step 710.

In step 714: determining whether any external object approximates to according to the whole-input-device first sensing information and/or determining whether any external object presses on according to the whole-input-device third sensing information. When an external object approximates to and/or presses on, the process enters into the touch sensitive processing method 600. When a user uses an active stylus to press the key, it is unnecessary to determine whether an external object approximates to. When a user uses an active stylus to perform inputting, it may need to determine whether an external object presses on and approximates to.

In step 720: having the sensing circuit respectively couple all the first electrodes and all the second electrodes to detect electrical signal emitted by an active stylus to produce an active stylus position according to detection result during an active stylus detection period.

In step 722: determining if any active stylus position. The process returns to the beginning if there is no any active stylus position. The process goes to the step 730 or 740 if there is any active stylus position.

In step 730: calculating a stylus reporting position according to the active stylus position or the pressing position that corresponds to the active stylus; and having the interface device send the stylus reporting position to the host. Wherein the stylus reporting position selects from one of the following: the pressing position; the active stylus position; a midpoint position between the pressing position and the active stylus position; and a weighted position between the pressing position and the active stylus position, wherein the weighted position is determined how far it is to the pressing position according to a pressure value of the active stylus.

In step 740: a pressure sensor is installed on the active stylus for detecting a stylus pressure value, the electrical signal includes the stylus pressure value being modulated. The step could include: demodulating the electrical signal to obtain the stylus pressure value; calculating a modified pressure value according to the stylus pressure value or the pressure value and having the interface device send the modified pressure value to the host. Wherein the modified pressure value selects from one of the following: the stylus pressure value; the pressure value; an average value of the stylus pressure value and the pressure value; and an average value of the stylus pressure value being weighted and the pressure value being weighted, wherein weighted weights change according to pressure gradient.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive processing apparatus coupled to a touch sensitive input device and a host, wherein the touch sensitive input device comprises multiple parallel first electrodes, multiple parallel second electrodes, multiple parallel third electrodes, and an elastic dielectric layer between the second and third electrodes, wherein the touch sensitive input device comprises a key zone, the key zone comprises multiple key areas, each of the first electrodes and the second electrodes form multiple approximation intersection areas in the key zone, each of the second electrodes and the third electrodes form multiple pressing intersection areas in the key zone, each of the key areas comprises at least one of the approximation intersection areas and the pressing intersection areas, the touch sensitive processing apparatus comprising:

an interface device coupled to the host;
a driving circuit respectively coupled to the second electrodes;
a sensing circuit respectively coupled to the first electrodes and the third electrodes; and
a processor coupled to the interface device, the driving circuit, and the sensing circuit, the processor is configured to:
control the driving circuit respectively to drive the second electrodes in turn;
control the sensing circuit respectively to sense the first electrodes to produce a one-dimensional first sensing information consisting of multiple first sensing information and respectively sense the third electrodes to produce a one-dimensional third sensing information consisting of multiple third sensing information when each of the second electrodes is driven;
piece each of the one-dimensional first sensing information corresponding to its corresponding second electrode together into a two-dimensional first sensing information and to piece each of the one-dimensional third sensing information together into a two-dimensional third sensing information after all the second electrodes have been driven;
calculate an approximating position of an external object according to the two-dimensional first sensing information and calculate a pressing position of the external object according to the two-dimensional third sensing information;
calculate a reporting position according to the pressing position or the approximating position when the distance between the pressing position and the approximating position is within a range;
determine whether the reporting position is in one of the key areas; and
control the interface device to send a key symbol corresponding to the key area into the host when the reporting position is in one of the key areas.

2. The touch sensitive processing apparatus according to claim 1, wherein the touch sensitive input device further comprises a touch area, each of the first electrodes and the second electrodes form multiple approximation intersection areas in the touch area, wherein the processor is further configured to control the interface device to send the approximating position to the host when the approximating position is in the touch area.

3. The touch sensitive processing apparatus according to claim 2, wherein the relation between the touch area and the key zone selects from one of the following: the touch area comprising the key zone; and the touch area and the key zone are not overlapped.

4. The touch sensitive processing apparatus according to claim 1, wherein the reporting position selects from one of the following:
the pressing position;
the approximating position;
a midpoint position between the pressing position and the approximating position; and
a weighted position between the pressing position and the approximating position, wherein the weighted position is determined how far it is to the pressing position according to a pressure value of the external object.

5. The touch sensitive processing apparatus according to claim 4, wherein the pressure value is calculated according to one of the following:
a sum of multiple third sensing information near the pressing position those are larger than a third threshold value;
one of the third sensing information that is closest to the pressing position;
a sum of multiple third sensing information those correspond to multiple first sensing information near the approximating position corresponding to the pressing position those are larger than a first threshold value; and
a sum of multiple third sensing information near the approximating position corresponding to the pressing position.

6. The touch sensitive processing apparatus according to claim 1, wherein the processor is further configured to control the interface device to send a key symbol corresponding to a key area into the host when the reporting position is in the key area and a pressure value of the external object is further determined it is bigger than a key pressure threshold.

7. The touch sensitive processing apparatus according to claim 1, wherein the frequency of calculating the reporting position is higher than that of sending the key symbol to the host.

8. The touch sensitive processing apparatus according to claim 1, wherein the first electrodes and the second electrodes are on the same electrode layer, the third electrodes comparing with the second electrodes are closer to the external object.

9. The touch sensitive processing apparatus according to claim 1, wherein the first electrodes and the third electrodes are respectively above/below the upside and the downside of the second electrodes, the first electrodes comparing with the third electrodes are closer to the external object.

10. The touch sensitive processing apparatus according to claim 9, wherein the processor is further configured to control all the first electrodes to be grounded or connect to a direct current voltage when the one-dimensional third sensing information is produced.

11. The touch sensitive processing apparatus according to claim 1, wherein the processor is configured to control all the third electrodes be grounded or connect to a direct current voltage when the one-dimensional first sensing information is produced.

12. The touch sensitive processing apparatus according to claim 1, wherein the processor is further configured to establish a pressing trajectory and an approximating trajectory respectively according to the pressing positions and the approximating positions of the external object; and to revise the pressing position getting from the last calculation according to the pressing trajectory and revising the approximating position getting from the last calculation according to the approximating trajectory.

13. The touch sensitive processing apparatus according to claim 12, wherein the processor is configured to:
perform a prediction based on the pressing trajectory to obtain a pressing prediction area;
perform a prediction based on the approximating trajectory to obtain an approximating prediction area;
comb the pressing prediction area with the approximating prediction area to identify a prediction region that needs to be sensed;
find respectively a first electrode set, a second electrode set, and a third electrode set that the first electrodes, the second electrodes, and the third electrodes correspondingly relate to the prediction region;
control the driving circuit respectively to drive in turn multiple second electrodes in the second electrode set;
control the sensing circuit respectively to sense multiple first electrodes in the first electrode set to produce the one-dimensional first sensing information consisting of multiple first sensing information and respectively sense multiple third electrodes in the third electrode set to produce the one-dimensional third sensing information consisting of multiple third sensing information when each of the second electrode is driven;
piece each of the one-dimensional first sensing information corresponding to its corresponding second electrode together into the two-dimensional first sensing information and piece each of the one-dimensional third sensing information together into the two-dimensional third sensing information after all the second electrodes in the second electrode set have been driven; and
calculate the approximating position of an external object according to the two-dimensional first sensing information and calculate the pressing position of the external object according to the two-dimensional third sensing information.

14. The touch sensitive processing apparatus according to claim 1, wherein the driving circuit respectively drives the second electrodes according to the following sequence:
from bottom to top;
from top to bottom; and
randomly.

15. The touch sensitive processing apparatus according to claim 1, wherein the processor is configured to:
find out at least one palm touch area according to the two-dimensional first sensing information; and
control the interface device not to send the key symbol corresponding to the key area to the host when the reporting position is in the palm touch area.

16. The touch sensitive processing apparatus according to claim 1, wherein the processor is configured to:
control the sensing circuit respectively to couple all the first electrodes and all the second electrodes to detect electrical signal emitted by an active stylus to produce an active stylus position according to detection result during an active stylus detection period;
calculate a stylus reporting position according to the active stylus position or the pressing position that corresponds to the active stylus; and
control the interface device to send the stylus reporting position to the host.

17. The touch sensitive processing apparatus according to claim 16, wherein the stylus reporting position selects from one of the following:
  the pressing position;
  the active stylus position;
  a midpoint position between the pressing position and the active stylus position; and
  a weighted position between the pressing position and the active stylus position, wherein the weighted position is determined how far it is to the pressing position according to a pressure value of the active stylus.

18. The touch sensitive processing apparatus according to claim 1, wherein a pressure sensor is installed on the active stylus for detecting a stylus pressure value, the electrical signal comprises the stylus pressure value being modulated, wherein the processor is configured to:
  demodulate the electrical signal to obtain the stylus pressure value;
  calculate a modified pressure value according to the stylus pressure value or a pressure value detecting by the touch sensitive input device; and
  control the interface device to send the modified pressure value to the host.

19. The touch sensitive processing apparatus according to claim 18, wherein the modified pressure value selects from one of the following:
  the stylus pressure value;
  the pressure value;
  an average value of the stylus pressure value and the pressure value; and
  an average value of the stylus pressure value being weighted and the pressure value being weighted, wherein weighted weights change according to pressure gradient.

20. A touch sensitive processing method comprising:
  providing a touch sensitive processing apparatus, wherein the touch sensitive processing apparatus couples to a touch sensitive input device and a host, the touch sensitive input device comprises multiple parallel first electrodes, multiple parallel second electrodes, multiple parallel third electrodes, and an elastic dielectric layer between the second and third electrodes, wherein the touch sensitive input device comprises a key zone, the key zone comprises multiple key areas, each of the first electrodes and the second electrodes form multiple approximation intersection areas in the key zone, each of the second electrodes and the third electrodes form multiple pressing intersection areas in the key zone, each of the key areas comprises at least one of the approximation intersection areas and the pressing intersection areas;
  having a driving circuit of the touch sensitive processing apparatus respectively drive the second electrodes in turn;
  having a sensing circuit of the touch sensitive processing apparatus respectively sense the first electrodes to produce a one-dimensional first sensing information consisting of multiple first sensing information and respectively sense the third electrodes to produce a one-dimensional third sensing information consisting of multiple third sensing information when each of the second electrodes is driven;
  piecing each of the one-dimensional first sensing information corresponding to its corresponding second electrode together into a two-dimensional first sensing information and piecing each of the one-dimensional third sensing information together into a two-dimensional third sensing information after all the second electrodes have been driven;
  calculating an approximating position of an external object according to the two-dimensional first sensing information and calculating a pressing position of the external object according to the two-dimensional third sensing information;
  calculating a reporting position according to the pressing position or the approximating position when the distance between the pressing position and the approximating position is within a range;
  determining whether the reporting position is in one of the key areas; and
  having the interface device send a key symbol corresponding to the key area into the host when the reporting position is in one of the key areas.

21. The touch sensitive processing method according to claim 20, wherein the touch sensitive input device further comprises a touch area, each of the first electrodes and the second electrodes form multiple approximation intersection areas in the touch area, wherein the touch sensitive processing method further comprises: having the interface device send the approximating position to the host when the approximating position is in the touch area.

22. The touch sensitive processing method according to claim 21, wherein the relation between the touch area and the key zone selects from one of the following: the touch area comprising the key zone; and the touch area and the key zone are not overlapped.

23. The touch sensitive processing method according to claim 20, wherein the reporting position selects from one of the following:
  the pressing position;
  the approximating position;
  a midpoint position between the pressing position and the approximating position; and
  a weighted position between the pressing position and the approximating position, wherein the weighted position is determined how far it is to the pressing position according to a pressure value of the external object.

24. The touch sensitive processing method according to claim 23, wherein the pressure value is calculated according to one of the following:
  a sum of multiple third sensing information near the pressing position those are larger than a third threshold value;
  one of the third sensing information that is closest to the pressing position;
  a sum of multiple third sensing information those correspond to multiple first sensing information near the approximating position corresponding to the pressing position those are larger than a first threshold value; and
  a sum of multiple third sensing information near the approximating position corresponding to the pressing position.

25. The touch sensitive processing method according to claim 20, further comprising: having the interface device send a key symbol corresponding to a key area into the host when the reporting position is in the key area and a pressure value of the external object is further determined it is bigger than a key pressure threshold.

26. The touch sensitive processing method according to claim 20, wherein the frequency of calculating the reporting position is higher than that of sending the key symbol to the host.

27. The touch sensitive processing method according to claim 20, wherein the first electrodes and the second electrodes are on the same electrode layer, the third electrodes comparing with the second electrodes are closer to the external object.

28. The touch sensitive processing method according to claim 20, wherein the first electrodes and the third electrodes are respectively above/below the upside and the downside of the second electrodes, the first electrodes comparing with the third electrodes are closer to the external object.

29. The touch sensitive processing method according to claim 28, further comprising: having all the first electrodes be grounded or connect to a direct current voltage when the one-dimensional third sensing information is produced.

30. The touch sensitive processing method according to claim 20, further comprising: having all the third electrodes be grounded or connect to a direct current voltage when the one-dimensional first sensing information is produced.

31. The touch sensitive processing method according to claim 20, further comprising:
establishing a pressing trajectory and an approximating trajectory respectively according to the pressing positions and the approximating positions of the external object; and
revising the pressing position getting from the last calculation according to the pressing trajectory and revising the approximating position getting from the last calculation according to the approximating trajectory.

32. The touch sensitive processing method according to claim 31, further comprising:
performing a prediction based on the pressing trajectory to obtain a pressing prediction area;
performing a prediction based on the approximating trajectory to obtain an approximating prediction area;
combining the pressing prediction area with the approximating prediction area to identify a prediction region that needs to be sensed;
finding respectively a first electrode set, a second electrode set, and a third electrode set that the first electrodes, the second electrodes, and the third electrodes correspondingly relate to the prediction region;
having the driving circuit respectively drive in turn multiple second electrodes in the second electrode set;
having the sensing circuit respectively sense multiple first electrodes in the first electrode set to produce the one-dimensional first sensing information consisting of multiple first sensing information and respectively sense multiple third electrodes in the third electrode set to produce the one-dimensional third sensing information consisting of multiple third sensing information when each of the second electrode is driven;
piecing each of the one-dimensional first sensing information corresponding to its corresponding second electrode together into the two-dimensional first sensing information and piecing each of the one-dimensional third sensing information together into the two-dimensional third sensing information after all the second electrodes in the second electrode set have been driven; and
calculating the approximating position of an external object according to the two-dimensional first sensing information and calculating the pressing position of the external object according to the two-dimensional third sensing information.

33. The touch sensitive processing method according to claim 20, wherein the driving circuit respectively drives the second electrodes according to the following sequence:
from bottom to top;
from top to bottom; and
randomly.

34. The touch sensitive processing method according to claim 20, further comprising:
finding out at least one palm touch area according to the two-dimensional first sensing information; and
having the interface device not send the key symbol corresponding to the key area to the host when the reporting position is in the palm touch area.

35. The touch sensitive processing method according to claim 20, further comprising:
having the sensing circuit respectively couple all the first electrodes and all the second electrodes to detect electrical signal emitted by an active stylus to produce an active stylus position according to detection result during an active stylus detection period;
calculating a stylus reporting position according to the active stylus position or the pressing position that corresponds to the active stylus; and
having the interface device send the stylus reporting position to the host.

36. The touch sensitive processing method according to claim 35, wherein the stylus reporting position selects from one of the following:
the pressing position;
the active stylus position;
a midpoint position between the pressing position and the active stylus position; and
a weighted position between the pressing position and the active stylus position, wherein the weighted position is determined how far it is to the pressing position according to a pressure value of the active stylus.

37. The touch sensitive processing method according to claim 20, wherein a pressure sensor is installed on the active stylus for detecting a stylus pressure value, the electrical signal comprises the stylus pressure value being modulated, wherein touch sensitive processing method further comprises:
demodulating the electrical signal to obtain the stylus pressure value;
calculating a modified pressure value according to the stylus pressure value or a pressure value detecting by the touch sensitive input device; and
having the interface device send the modified pressure value to the host.

38. The touch sensitive processing method according to claim 37, wherein the modified pressure value selects from one of the following:
the stylus pressure value;
the pressure value;
an average value of the stylus pressure value and the pressure value; and
an average value of the stylus pressure value being weighted and the pressure value being weighted, wherein weighted weights change according to pressure gradient.

* * * * *